(12) United States Patent
Arai et al.

(10) Patent No.: US 7,549,801 B2
(45) Date of Patent: Jun. 23, 2009

(54) HEAVY LOAD SUPPORT SYSTEM

(75) Inventors: Takao Arai, Uji (JP); Kouya Watanabe, Numazu (JP); Shumpei Ohtsuka, Yokohama (JP)

(73) Assignee: Yugen Kaisha Newly Laboratory, Kyoto (JP)

( * ) Notice: Subject to any disclaimer, the term of this patent is extended or adjusted under 35 U.S.C. 154(b) by 365 days.

(21) Appl. No.: 10/587,926

(22) PCT Filed: Feb. 5, 2004

(86) PCT No.: PCT/JP2004/001172

§ 371 (c)(1),
(2), (4) Date: Aug. 1, 2006

(87) PCT Pub. No.: WO2005/075859

PCT Pub. Date: Aug. 18, 2005

(65) Prior Publication Data

US 2007/0170344 A1    Jul. 26, 2007

(51) Int. Cl.
*F16C 29/02* (2006.01)
(52) U.S. Cl. .............................. 384/13; 384/15; 384/26
(58) Field of Classification Search ................. 384/12, 384/13, 15, 26
See application file for complete search history.

(56) References Cited

U.S. PATENT DOCUMENTS

| 3,610,365 | A | * | 10/1971 | Maddox et al. | 384/12 |
|---|---|---|---|---|---|
| 3,717,392 | A | * | 2/1973 | Ennis | 384/12 |
| 3,841,719 | A | * | 10/1974 | Smith | 384/12 |
| 3,921,286 | A | * | 11/1975 | Petersen | 384/12 |
| 3,994,540 | A | * | 11/1976 | Petersen | 384/12 |
| 4,080,009 | A | * | 3/1978 | Marathe et al. | 384/12 |
| 5,087,129 | A | * | 2/1992 | Schneider | 384/12 |

FOREIGN PATENT DOCUMENTS

| DE | 1926004 | 5/1969 |
|---|---|---|
| JP | 50-7688 | 3/1975 |
| JP | 67119/1985 | 5/1985 |
| JP | 16230/1986 | 2/1986 |
| JP | 62-278332 | 12/1987 |
| JP | 15281/1990 | 2/1990 |
| JP | 22746/1990 | 3/1990 |
| JP | 46165/1990 | 4/1990 |
| JP | 87906/1990 | 8/1990 |
| JP | 2002-156043 | 5/2002 |

OTHER PUBLICATIONS

Translation re PCT/JP2004/001172; International Preliminary Report on Patentability.

* cited by examiner

*Primary Examiner*—Thomas R Hannon
(74) *Attorney, Agent, or Firm*—TIPS Group

(57) ABSTRACT

A fluid sealing mechanism for sealing fluid being fed into a fluid pressure pocket formed between sliding surfaces which are formed on the opposing surfaces of an article being supported and a support for supporting the article, wherein a ring groove being fitted with a resilient ring for sealing fluid is made in the sliding surface of the support. Under a state where a regulation ring for preventing the resilient ring from jumping out of the ring groove is fitted over the re-silient ring, the regulation ring is fitted in the ring groove along with the resilient ring. When the fluid fed into the fluid pressure pocket reaches a specified pressure, the regulation ring comes into pressure contact with the sliding surface of the support along with the resilient ring, thus preventing the resilient ring from jumping out.

7 Claims, 16 Drawing Sheets

PRIOR ART

PRIOR ART

HEAVY LOAD SUPPORT SYSTEM

CROSS REFERENCE TO RELATED APPLICATIONS

This application is a 371 of PCT/JP04/01172, filed on Feb. 5, 2004.

FIELD OF THE INVENTION

The present invention relates to a fluid sealing mechanism that supports, for example, a heavy load (workpiece) to be machined so as to be able to position the same via pressurized fluid so that the heavy load is positioned (in a horizontal position, in a vertical position), and a heavy load support system equipped with the fluid sealing mechanism, which is simple in structure and is of portable nature.

BACKGROUND OF THE INVENTION

When a workpiece is to be machined by a working machine, it is necessary to bring the coordinate system of the workpiece mounted on a machine platen into line with the coordinate system of the working machine, and therefore the workpiece is usually fine-adjusted (centering operation) on the machine platen. Frequently used for supporting the workpiece is a fluid-pressure support system that utilizes a slide surface of a static pressure pocket. This fluid-pressure support system supports a workpiece by a pressurized fluid (hydraulic oil) while floating the same, and therefore achieves relatively easy moving operation of the workpiece thanks to low friction force caused by the movement in the horizontal direction.

An example of the structure of the fluid-pressure support system is illustrated in FIG. 16. In this example, the system is so structured to have an object to be supported (workpiece or mounting table for mounting the workpiece) 71, slide surfaces 73, 74 formed respectively on the oppositely facing sides of the object 71 and a support member 72 for supporting the object 71, a pressurized fluid being discharged from a fluid supplying unit 77 and introduced via a throttle 78 into a ring groove 76 formed in the slide surface 74 on the side of the support member 72, and a static pressure pocket 75 formed between the slide surfaces 73, 74 in the area surrounded by the ring groove 76.

However, the static pressure pocket 75 which is exposed to the atmosphere causes flowing-out of the pressurized fluid therefrom. Therefore, pressurized fluid must be constantly supplied and a recovering mechanism for recovering the fluid which tends to be increased in size. This causes a disadvantage in that the entire size of the system is increased and running costs are also increased. In addition, the static pressure pocket 75 exposed to the atmosphere produces a pressure of generally only about 0.5 to 1 MPa to the slide surfaces, and therefore is likely to cause insufficient surface pressure for a heavy workpiece. Meanwhile, there is caused a surface pressure of only about 0.2 to 0.3 MPa to a usual dynamic pressure slide surface.

For example, in order to easily position a heavy workpiece, such as a workpiece having a weight of more than 10 tons, with respect to a working machine, a slide surface pressure of about 25 MPa (ultra high fluid pressure) is required. However, a fluid-pressure support system utilizing a slide surface of the conventional static pressure pocket as described above is highly unlikely to be able to ensure such a high surface pressure. For ensuring such a high surface pressure, a structure for allowing a fluid pressure pocket to be formed between the slide surfaces while allowing the same to be sealed from the atmosphere is required, but for this, a nonconventional, rigid fluid sealing mechanism that is capable of ensuring high sealability must be provided.

The present invention has been conceived in consideration of the above circumstances. It is an object of the present invention to provide a fluid sealing mechanism with a good sealability so as to be able to ensure a high surface pressure between the slide surfaces of the object and the support member, and a heavy load support system that is equipped with the fluid sealing mechanism, as well as being simple in structure and compact in size.

It is desirable that such a heavy load support system can as well perform positional adjustment of an object to be supported (workpiece or mounting table for supporting the workpiece) in the vertical position. Thus, it is another object of the present invention to achieve this purpose.

SUMMARY OF THE INVENTION

A fluid sealing mechanism of the present invention is structured in the manner as mentioned below to achieve the above objects.

1. There is provided a fluid sealing mechanism for preventing leakage of fluid being supplied into a fluid pressure pocket defined between slide surfaces respectively formed on oppositely facing sides of an object and a support member for supporting the object, in which the slide surface of the support member has a ring groove for fittingly receiving an elastic ring for preventing leakage of fluid, and the elastic ring is fitted along with a blocking ring, which is (disposed outside the elastic ring, in the ring groove, with the blocking ring fitted on the elastic ring for blocking the elastic ring from coming out from the ring groove, and when fluid supplied into the fluid pressure pocket has reached a required pressure, the blocking ring is, along with the elastic ring, brought into press contact with the slide surface of the object so as to block the coming-out of the elastic ring.

With the structure as mentioned above, when the pressure of fluid supplied into the fluid pressure pocket reaches a required pressure and a supporting force enabling smooth sliding between the slide surfaces is generated, the blocking ring is, along with the elastic ring, brought into press contact with the slide surface of the object so that the elastic ring is surrounded from the outside by the blocking ring. Thus, the elastic ring is prevented from being deformed towards the outer circumference and hence blocked from coming out from the ring groove. Whereby, it is possible to securely maintain high sealability, and even in a case where the weight of the object exceeds, for example, 10 tons, it is possible to ensure a slide surface pressure of a required ultra high pressure (e.g., about 25 MPa) and apply this structure to a heavy load support system.

In the above structure, the slide surfaces respectively formed on the oppositely facing sides of the object and the support member each may be formed into a planar or curved shape. For the elastic ring, for example, a commercially available O-ring made of a synthetic rubber (polymeric material) may be used. The ring groove for fittingly receiving the elastic ring may be formed on the object. For the blocking ring, for example, a polymeric material such as a TEFLON (a registered trademark) material and various plastic materials, and a bearing material of metal such as zinc bronze may be used. No limitation is intended on the material of the elastic ring or the blocking ring in the present invention, and an appropriate material may be selected according to the designing condition or the like.

The slide surfaces respectively formed on the oppositely facing sides of the object and the support member are machined to be satisfactorily smoothened to such an extent to form a highly sealed condition relative to the elastic ring. By the required pressure is meant an ultra high pressure of about 25 MPa or lower. However, no limitation is intended on this, and the required pressure may be appropriately selected and set according to the use conditions or the like. These are also applicable to the invention mentioned below.

The object may be a workpiece. With this, a workpiece mounting table can be omitted. Alternatively, the object may be a workpiece mounting table for mounting thereon a workpiece. With this, it is not necessary to form a slide surface on a bottom side of the workpiece.

The fluid sealing mechanism may be structured in the manner mentioned below.

2. It may be structured so that the blocking ring has an inner circumference whose upper edge is provided with a coming-out blocking portion that is formed into a radially inwardly curved shape so as to be lockingly engaged with the elastic ring around an outer circumferential edge thereof through pressure contact for prevention of a radially outward deformation of the outer circumferential edge of a portion of the elastic ring, which portion contacting the object. With this structure, when fluid has been supplied into the fluid pressure pocket and reached to required pressure, the outer circumferential edge of the elastic ring is lockingly engaged with the coming-out blocking portion of the elastic ring through pressure contact so that it is possible to effectively prevent an outward deformation of the elastic ring.

Another fluid sealing mechanism of the present invention is structured in the manner as mentioned below to achieve the above objects.

3. There is provided a fluid sealing mechanism for preventing leakage of fluid supplied into a fluid pressure pocket defined between slide surfaces respectively formed on oppositely facing sides of an object and a support member for supporting the object, in which the support member has a ring groove for fittingly receiving an elastic ring for preventing leakage of fluid, and the elastic ring has an outer circumference whose upper edge is provided with a hardened portion integrally formed therewith for blocking the elastic ring from coming out from the ring groove, and when fluid supplied into the fluid pressure pocket has reached a required pressure, an upper surface of the hardened portion is brought into press contact with the slide surface of the object in surface-to-surface contact, and a side surface of the hardened portion is brought into press contact with an outer inside wall surface of the ring groove in surface-to-surface contact, thereby blocking the coming-out of the elastic ring.

With the above structure, when fluid supplied into the fluid pressure pocket has reached a required pressure and a supporting force enabling smooth sliding between the slide surfaces has been generated, an upper surface of the hardened portion integrally formed with the elastic ring is brought into press contact with the slide surface of the object in surface-to-surface contact, and a side surface of the hardened portion is brought in to press contact with an outer inside wall surface of the ring groove in surface-to-surface contact. Accordingly, the elastic ring is prevented from being deformed towards the outer circumference and hence blocked from coming out from the ring groove. Whereby, it is possible to securely maintain high sealability, and even in a case where the weight of the object exceeds, for example, 10 tons, it is possible to ensure a slide surface pressure of a required ultra high pressure (e.g., about 25 MPa) and apply this structure to a heavy load support system.

The hardened portion may be formed integrally with the elastic ring such as by partially vulcanizing the upper edge of the outer circumference of the elastic ring made of a polymeric material such as a synthetic rubber, or partially reinforcing the elastic ring when molding with glass fibers placed therein.

The hardened portion may be formed by a material different from the material of the elastic ring and bonded thereto by a bonding means. In this case, for the hardened portion, a polymeric material such as a TEFLON (a registered trademark) material and various plastic materials, and a bearing material of metal such as zinc bronze may be used. These may be formed into a ring shape and formed integrally with the elastic ring by the use of an appropriate bonding means. For the bonding means, various polymeric adhesive materials such as a rubber type adhesive may be used.

A different fluid sealing mechanism of the present invention is structured in the manner as mentioned below to achieve the above objects.

4. There is provided a fluid sealing mechanism for preventing leakage of fluid supplied into a fluid pressure pocket defined between slide surfaces respectively formed on oppositely facing sides of an object and a support member for supporting the object, in which the slide surface of the support member has a ring groove for fittingly receiving an elastic ring for preventing leakage of fluid, and the ring groove has an outer inside wall surface whose upper portion is provided with a coming-out blocking portion that is lockingly engaged with an upper edge of an outer circumference of the elastic ring so as to block the elastic ring from coming out from the ring groove at the time when fluid supplied into the fluid pressure pocket has reached a required pressure.

With the above structure, when fluid supplied into the fluid pressure pocket has reached a required pressure and a supporting force enabling smooth sliding between the slide surfaces has been generated, the upper edge of the outer circumference of the elastic ring is lockingly engaged with the coming-out blocking portion so that the elastic ring is prevented from being deformed towards the outer circumference and hence blocked from coming out from the ring groove. Whereby, it is possible to securely maintain high sealability, and even in a case where the weight of the object exceeds, for example, 10 tons, it is possible to ensure a slide surface pressure of a required ultra high pressure (e.g., about 25 MPa) and apply this structure to a heavy load support system.

The coming-out blocking portion provided at the outer inside wall surface of the ring groove is preferably formed into a radially inwardly curved shape so as to be lockingly engaged with the elastic ring around the upper edge of its outer circumference through pressure contact when fluid supplied into the fluid pressure pocket has reached a required pressure. Thus, it is possible to effectively block the coming-out of the elastic ring from the ring groove.

A heavy load support system of the present invention is structured in the manner as mentioned below to achieve the above objects.

5. There is provided a heavy load support system that includes the fluid sealing mechanism of any one of the above Items 1 to 4, the support member for supporting the object, and a connection means for connection with a fluid supply means that supplies fluid into the fluid pressure pocket defined between slide surfaces of the object and the support member.

With the structure as mentioned above, when the pressure of fluid supplied into the fluid pressure pocket reaches a required pressure, the elastic ring is blocked from coming out from the ring groove. Whereby, it is possible to securely maintain high sealability, and even in a case where the weight of the object exceeds, for example, 10 tons, it is possible to ensure a slide surface pressure of a required ultra high pressure (e.g., about 25 MPa), thereby achieving ease of centering operation for the object (workpiece or workpiece mounting table) and ensuring high accuracy centering. In addition, by separating the fluid supply means from the connection means, the system becomes compact in size enabling itself to be carried to the site, as well as being simple in structure and can be provided at low cost. The object may be supported by plural support members, or a single object may be supported by a single support member.

The object may be a single workpiece, while plural support members may be provided. With this arrangement, a workpiece mounting table is not needed. Alternatively, for example, a slide surface may be formed on the workpiece in the lengthwise direction and plural support members are aligned in parallel, (e.g., in two lines) in the same direction to support the workpiece along its opposite lateral sides, so that the workpiece may be endlessly moved in the lengthwise direction.

The heavy load support system may be structured in the manner as mentioned below.

6. A fluid supply stopping means for stopping supply of fluid into the fluid pressure pocket at the time when a given clearance (e.g., about 0.1 mm to 0.2 mm) has been created between the slide surfaces may be provided. With this structure, it is possible to securely control the clearance, ensure smooth sliding of the object, prevent the fluid pressure within the fluid pressure pocket from being unusually increased exceeding a required pressure, and effectively prevent the occurrence of leakage.

The fluid supply stopping means may be achieved by, for example, making a steel ball of a check valve move in association with a push rod disposed between the steel ball and the slide surface of the object. With this structure, when the pressure of fluid within the fluid pressure pocket is increased, thereby lifting the object and hence creating a clearance between the slide surfaces, the steel ball, which moves in association with the lifting of the push rod, closes the fluid supply passage and thereby stops the supply of fluid into the fluid pressure pocket.

7. A pressure control valve for stopping supply of fluid into the fluid pressure pocket at the time when fluid supplied into the fluid pressure pocket has reached a required pressure may be provided. With this structure, it is possible to securely perform pressure setting of the inside of the fluid pressure pocket and hence prevent the fluid pressure from being unusually increased exceeding a required pressure, so that the occurrence of leakage can be more effectively prevented.

In place of the pressure control valve, there may be provided a control means that controls the supply of fluid in order to set the pressure of fluid within the fluid pressure pocket at a required pressure based on the detected pressure value of fluid supplied into the fluid pressure pocket. With this structure, the control means is driven by a control program previously created, so that the pressure setting (pressure control) for fluid within the fluid pressure pocket can be automatically performed. Thus, for example, even in a case where the weight or center of gravity of a workpiece is changed, the set pressure of fluid can be easily changed and hence the operational efficiency can further be improved, since little troublesome works are to be made for changing the procedures.

Particularly, this is suitable for the case where plural workpieces having different weights and centers of gravity are to be successively machined by a working machine.

In a specific example regarding the above case, the fluid supply means is of an electric motor-driven type, and structured so that a pump is driven by a motor, a pressure detection means (e.g., pressure gauge) is disposed in the fluid supply passage, the pressure detection means is connected (via an A/D converter) to an input side of the control means that is made up of a CPU for performing various calculations and a RAM, ROM or the like having a storing function, and the motor (and the pressure control valve) is connected to an output side of the motor. In this respect, a control system capable of automatically setting the pressure of fluid within the fluid pressure pocket may be added to a fluid supply system, and its structure, type or the like is not necessary limited to a specific one.

8. A fluid supply stopping means for stopping supply of fluid into the fluid pressure pocket at the time when a given clearance (e.g., about 0.1 mm to 0.2 mm) has been created between the slide surfaces may be provided, and a pressure control valve for stopping supply of fluid into the fluid pressure pocket at the time when fluid supplied into the fluid pressure pocket has reached a required pressure may be provided.

With the above structure, at the time when any one of the clearance between the slide surfaces and the pressure of fluid within the fluid pressure pocket has reached a limit value, the supply of fluid into the fluid pressure pocket is stopped. Therefore, it is possible to proceed the operation based on an appropriate control selected from among the clearance control between the slide surfaces and the pressure control within the fluid pressure pocket. The operation may be proceeded based on any one of controls as selected according to needs and circumstances. Thus, it is possible to further improve the reliability of the fluid sealing mechanism.

9. A pressure adjusting means for adjusting the pressure of the inside of the fluid pressure pocket to a required pressure may be disposed in a fluid supply passage to the fluid pressure pocket so that the fluid supply passage to the fluid pressure pocket, which passage contains the pressure adjusting means, constitute a closed fluid passage. With this structure, after fluid has been supplied into the fluid pressure pocket and pressurized to a required pressure, the fluid supply means is separated from the connection means so that the fluid supply passage to the fluid pressure pocket, which passage contains the pressure adjusting means, constitutes a closed fluid passage, thereby enabling the pressure of fluid within the fluid pressure pocket to be maintained at a given pressure (required pressure). Thus, the fluid supply means is not needed for the subsequent operation, which further enhances ease of use.

The pressure adjusting means may be a fluid pressurizing cylinder or an accumulator. With this, it is possible to simplify the structure of the pressure adjusting means and provide the system at low cost. The fluid pressurizing cylinder may be structured to pressurize fluid by having a piston pushed thereinto upon operation of an irreversible rotary screw member. With this, it is possible to adjust (pressurize) the pressure of the fluid pressure pocket by the operation of the irreversible rotary screw member and hence maintain the pressure at a constant level. The irreversible rotary screw member may be provided with an operation lever or handle for ease of operation.

10. A fluid jack that is actuated in a vertical direction may be disposed above or below the fluid pressure pocket. With this structure, an object to be supported can be moved in three dimensional directions and hence can be positioned in three dimensions.

The fluid pressure pocket of the fluid sealing mechanism may be held in communication with a fluid pressure pocket of the fluid jack. With this, it is not necessary to provide an additional fluid supply means for the fluid jack, and hence the system can be simplified in structure, become compact in size and be provided at low cost.

Fluid may be supplied from the single fluid supply means to the fluid pressure pockets of plural fluid sealing mechanisms and the fluid pressure pocket of the fluid jack. With this, it is possible to share the fluid supply means and hence simplify the structure.

Alternatively, the object may be a single workpiece and the workpiece may be supported by plural support members. With this, a workpiece mounting table is not needed and the workpiece can be positioned in three dimensions. Also, for example, a slide surface may be formed on a workpiece in the lengthwise direction and plural support members are aligned in parallel, (e.g., in two lines) in the same direction to support the workpiece along its opposite lateral sides, so that the workpiece may be endlessly moved in the lengthwise direction.

Fluid may be supplied from the single fluid supply means to the fluid pressure pockets of plural fluid sealing mechanisms and the fluid pressure pockets of fluid jacks. With this, it is possible to share the fluid supply means and hence simplify the structure.

BEST MODE FOR CARRYING OUT THE INVENTION

The description will be made hereinafter for a fluid sealing mechanism and a heavy load support system equipped with the fluid sealing mechanism, of embodiments of the present invention.

Embodiment 1

Figure 1:
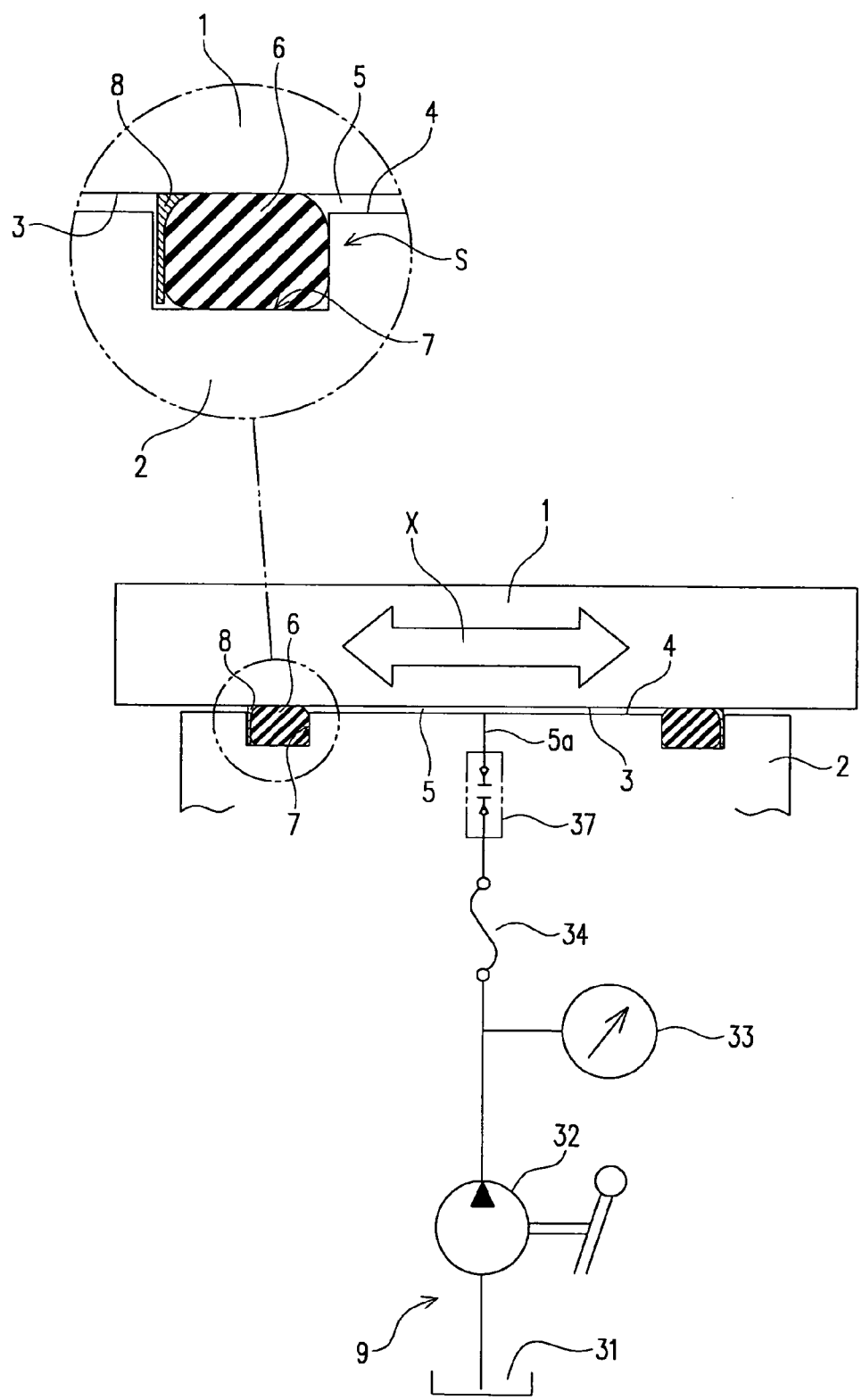
FIG. 1 is an explanatory view for the structure of a heavy load support system of Embodiment 1 of the present invention.
Figure 2:
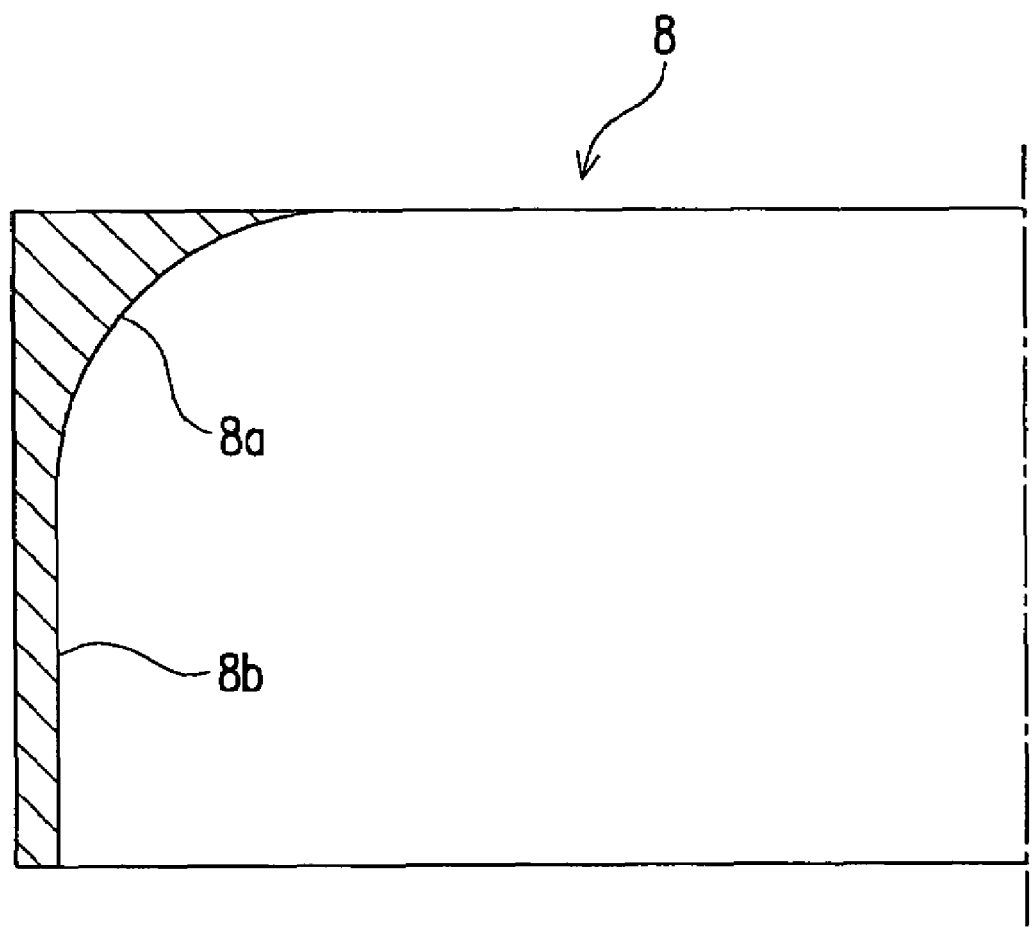
FIG. 2 is an enlarged sectional view of a blocking ring of the same.

The structure of this embodiment is illustrated in FIGS. 1 and 2, and FIG. 1 illustrates the structure of a heavy load support system. This heavy load support system includes a fluid sealing mechanism S for preventing leakage of pressurized fluid (e.g., hydraulic oil) being supplied into a fluid pressure pocket 5 (e.g., hydraulic pocket) 5 defined between slide surfaces 3, 4 respectively formed in the oppositely facing sides of an object 1 to be supported, as a workpiece or workpiece mounting table for mounting the workpiece thereon, and a support member 2 for supporting the object 1, and a quick joint 37 (connection means of the present invention) enabling separation from a fluid supply means 9.

The quick joint 37 is disposed at an upstream end of a fluid supply passage 5a that is in communication with the fluid pressure pocket 5, and is capable of allowing a hose 34, which is connected to a fluid tank (e.g., hydraulic oil tank) 31, to be detachably connected thereto. A manual pump 32 and a pressure gauge 33 are disposed in a fluid supply passage extending from the fluid tank 31 to the hose 34. A throttle (not shown), which faces the fluid pressure pocket, is disposed at a downstream end of the fluid supply passage 5a. The fluid tank 31 and the manual pump 32 together constitute the fluid supply means 9. An arrow X represents a moving direction (horizontal direction in the Figure) of the object 1.

The quick joint 37 is installed outside of the heavy load support system, and structured to automatically close upon the separation of the hose 34, thereby closing the fluid supply passage 5a that leads to the fluid pressure pocket 5. Therefore, the heavy load support system becomes significantly compact in size by the separation of the hose 34 from the quick joint 37, and hence can be carried to the site. This heavy load support system is simple in structure and can be provided at low cost. This advantage is produced in the same manner in the following embodiments.

Now, the description will be made for the fluid sealing mechanism S. The slide surface 4 of the support member 2 has a ring groove 7 for fittingly receiving an elastic ring 6 for preventing leakage of fluid. Disposed outside the elastic ring 6 is a blocking ring (ring-shaped part) 8 fitted, along with the elastic ring 6, in the ring groove 7 for blocking the elastic ring 6 from coming out from the ring groove 7, with the blocking ring 8 fitted on the elastic ring 6. When the pressure of fluid supplied into the fluid pressure pocket 5 reaches a required ultra high pressure (e.g., 25 MPa) and a supporting force enabling smooth sliding between the slide surfaces 3, 4 is generated, the blocking ring 8 is, along with the elastic ring 6, brought into press contact with the slide surface 3 of the object 1 so as to block the coming-out of the elastic ring 6.

The shape of the cross section of the blocking ring 8 is, for example, illustrated in FIG. 2. As illustrated, the blocking ring 8 has an inner circumference whose upper edge is provided with a coming-out blocking portion 8a, which is formed into a radially inwardly curved shape so as to be lockingly engaged with the elastic ring 6 around an outer circumferential edge through pressure contact for prevention of a radially outward deformation of the outer circumferential edge of a portion of the elastic ring 6, which portion contacting the object 1. The coming-out blocking portion 8a is formed with a relatively thick wall so as to have a strength enough to be able to block the coming-out of the elastic ring 6, and has a straight thin wall portion 8b continuing from a lower side thereof.

With the above structure, when the pressure of fluid supplied into the fluid pressure pocket 5 reaches a required pressure and a supporting force enabling smooth sliding between the slide surfaces 3, 4 is generated, the blocking ring 8 is, along with the elastic ring 6, brought into press contact with the slide surface 3 of the object 1 so that the elastic ring 6 is surrounded from the outside by the blocking ring 8. Thus, as described above, the elastic ring 6 is prevented from being deformed towards the outer circumference and hence blocked from coming out from the ring groove 7. Whereby, even in a case where the weight of the object exceeds, for example, 10 tons, it is possible to securely maintain high sealability and achieve ease of centering operation relative to a working machine (not shown).

In the above structure, the slide surfaces 3, 4 respectively formed on the oppositely facing sides of the object 1 and the support member 2 each may be formed into a planar or curved shape, and are preferably formed so as to form a fluid film having a thickness of about 0.1 to 0.2 mm between the slide surfaces 3, 4 at the time when fluid pressurized at a required pressure (e.g., about 25 MPa or lower) has been supplied into the fluid pressure pocket 5. These are also applicable in the same manner to the following embodiments.

The ring groove 7 for fittingly receiving the elastic ring 6 may be formed in the object 1, although no illustration is made, and in this case, the blocking ring 8 is set upside down. For the elastic ring 6, for example, a commercially available O-ring made of a synthetic rubber may be used, and for the blocking ring 8, for example, a polymeric material such as a TEFLON (a registered trademark) material and various plastic materials, and a bearing material of metal such as zinc bronze may be used.

Figure 15:
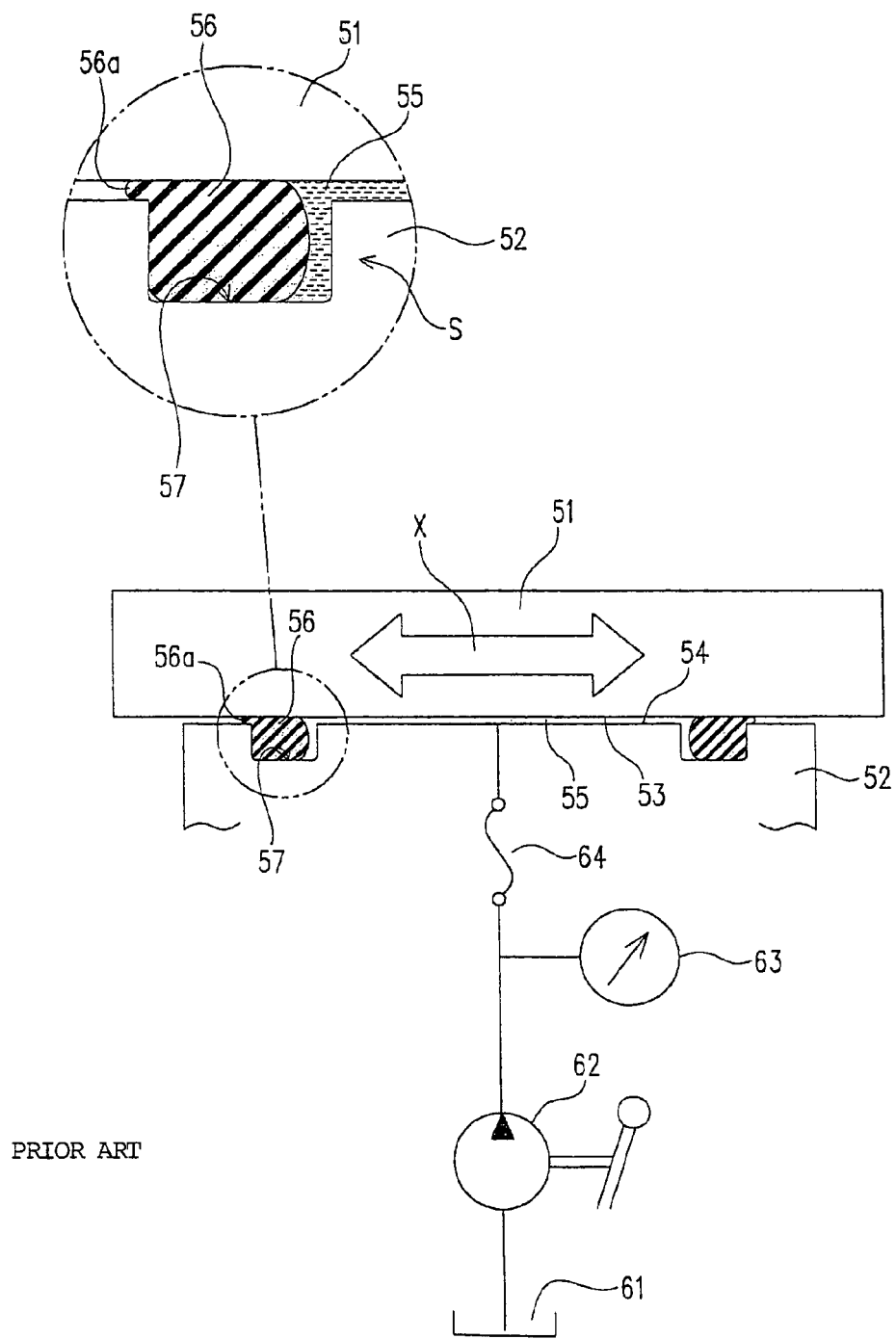
FIG. 15 is an explanatory view for the structure of a Comparative Example of a fluid sealing mechanism.
Figure 16:
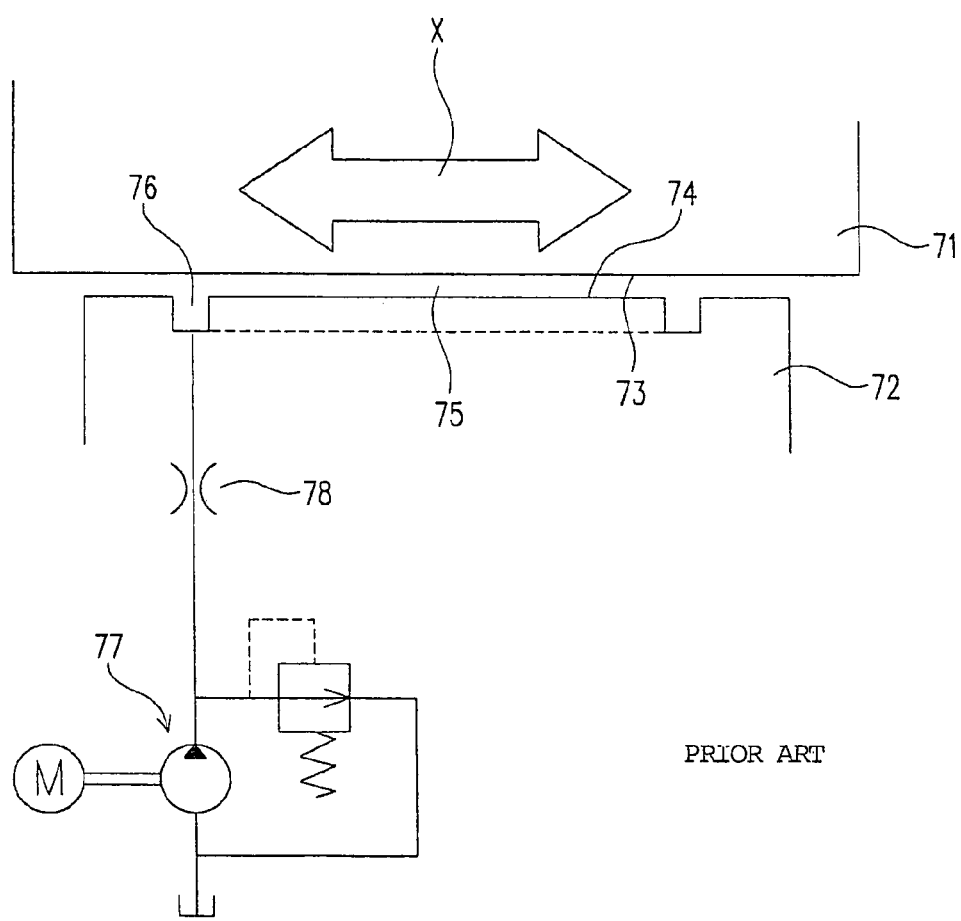
FIG. 16 is an explanatory view illustrating one example of a conventional fluid-pressure support system.

In a case where the blocking ring 8 as described above is not provided, as illustrated as a comparative example of the fluid sealing mechanism in FIG. 15, an elastic ring 56 fitted in a ring groove 57 formed in a slide surface 54 of a support member 52 is pressed towards the outer circumference by a pressurized fluid and deformed, causing a problem of having a portion 56a of its outer circumferential edge protruding away from the ring groove 57 into a space between a slide surface 53 and the slide surface 54.

In the above case, the protruding portion 56a of the elastic ring 56 may be broken and leakage therefrom may easily occur. Once the leakage occurs, an object 51 to be supported is unlikely to be smoothly moved and hence it is difficult to achieve the centering operation with high precision. In FIG. 15, reference numerals 61, 62, 63 and 64 respectively represent a fluid tank, a manual pump, a pressure gauge and a hose. An arrow X represents the moving direction (horizontal direction) of the object 1.

Embodiment 2

Figure 3:
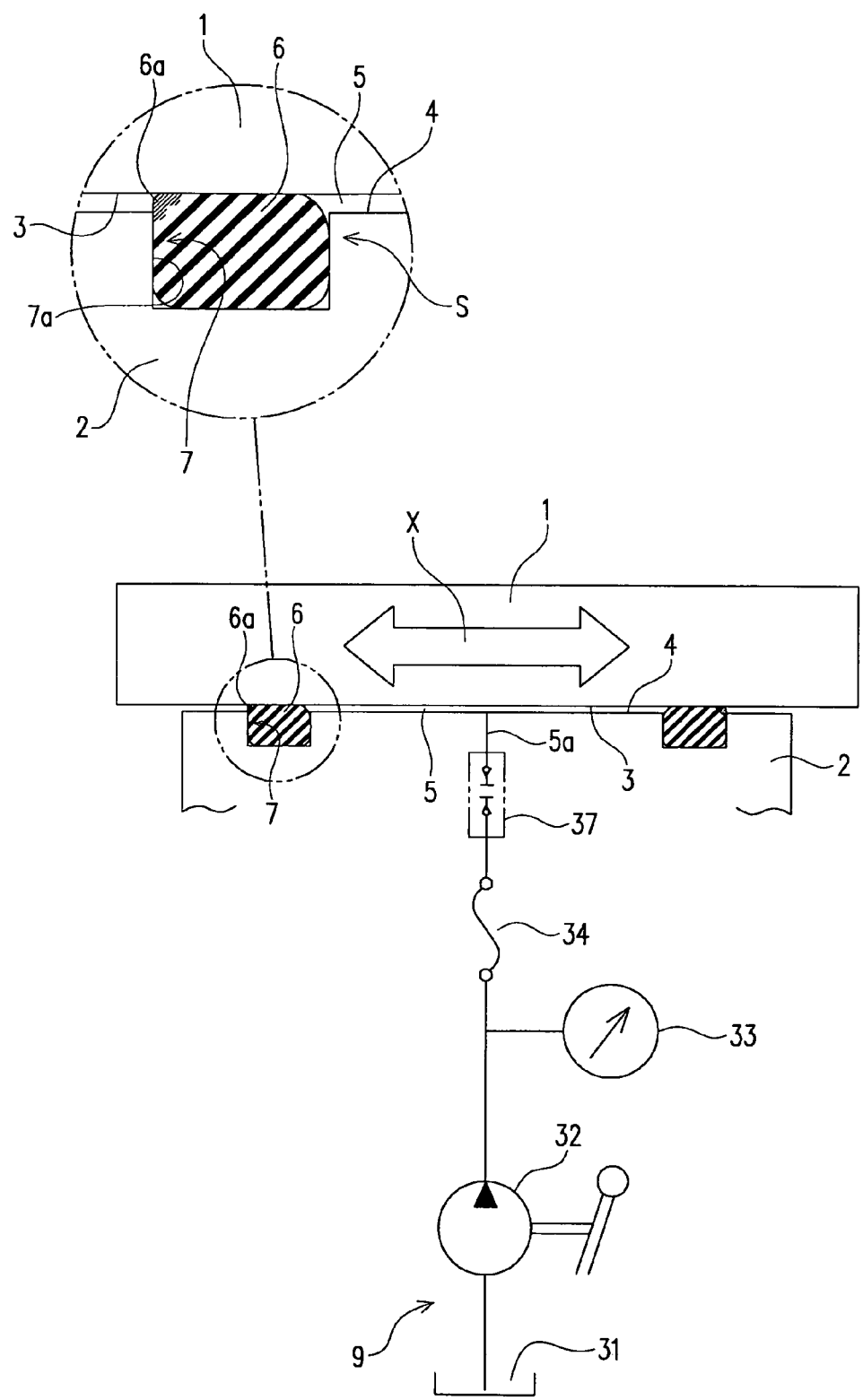
FIG. 3 is an explanatory view for the structure of a heavy load support system of Embodiment 2 of the present invention.

The structures of this embodiment are illustrated in FIGS. 3 and 4, in which FIG. 3 illustrates the structure of a heavy load support system. Identical or corresponding parts to those of the aforesaid embodiment have been given the same reference characters to omit a description thereof. This is applicable in the same manner to the following embodiments.

In this heavy load support system, the elastic ring 6 to be fitted in the ring groove 7 formed in the support member 2 has an outer circumference whose upper edge is provided with a hardened portion 6a integrally formed therewith for blocking of the coming-out of the elastic ring 6 from the ring groove 7. With this structure, when fluid has been supplied into the fluid pressure pocket 5, an upper surface of the hardened portion 6a integrally formed with the elastic ring 6 is brought into press contact with the slide surface 3 of the object 1 in surface-to-surface contact, and a side surface of the hardened portion 6a is brought into press contact with an outer inside wall surface 7a of the ring groove 7 in surface-to-surface contact. Accordingly, the elastic ring 6 is prevented from being deformed towards the outer circumference by fluid and hence blocked from coming out from the ring groove 7. Whereby, even in a case where the weight of the object exceeds, for example, 10 tons, it is possible to securely maintain high sealability and achieve ease of centering operation relative to a working machine (not shown).

Figure 4A:
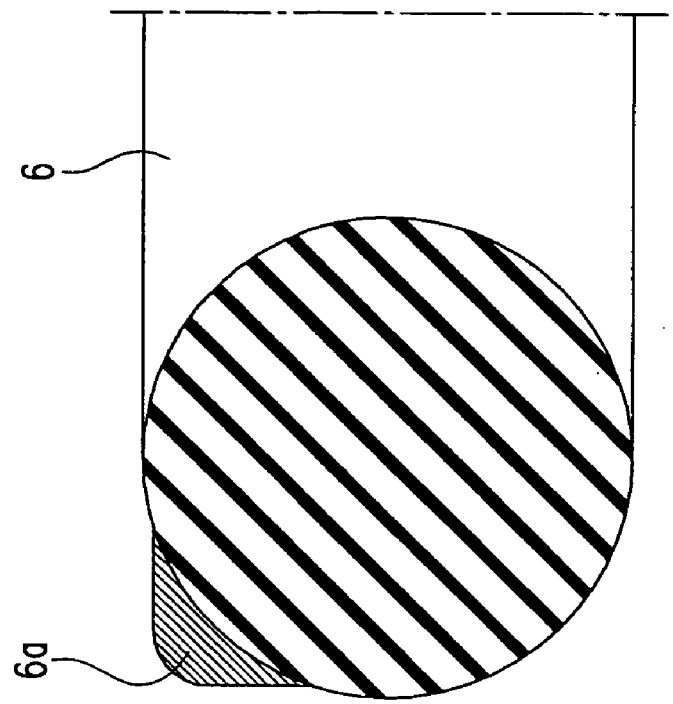
FIGS. 4 are cross sectional views of an elastic ring of the same.
Figure 4B:
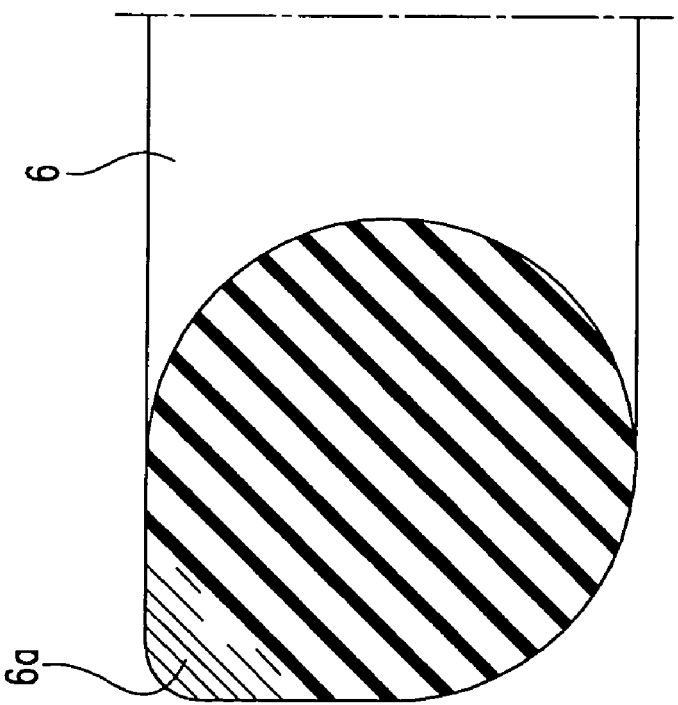

The hardened portion 6a may be formed integrally with the elastic ring 6 such as by partially vulcanizing the upper edge of the outer circumference of the elastic ring 6 made of a synthetic rubber, or partially reinforcing the elastic ring with glass fibers placed therein when molding (cf. FIG. 4(a)). The hardened portion 6a may be formed by a material different from the material of the elastic ring 6 and bonded thereto by a bonding means such as adhesive (cf. FIG. 4(b)). In this case, for the hardened portion 6a, a polymeric material such as a TEFLON (a registered trademark) material and various plastic materials, and a bearing material of metal such as zinc bronze may be used. These may be formed into a ring shape and formed integrally with the elastic ring 6 by the use of various polymeric adhesive materials such as a rubber type adhesive.

Embodiment 3

Figure 5:
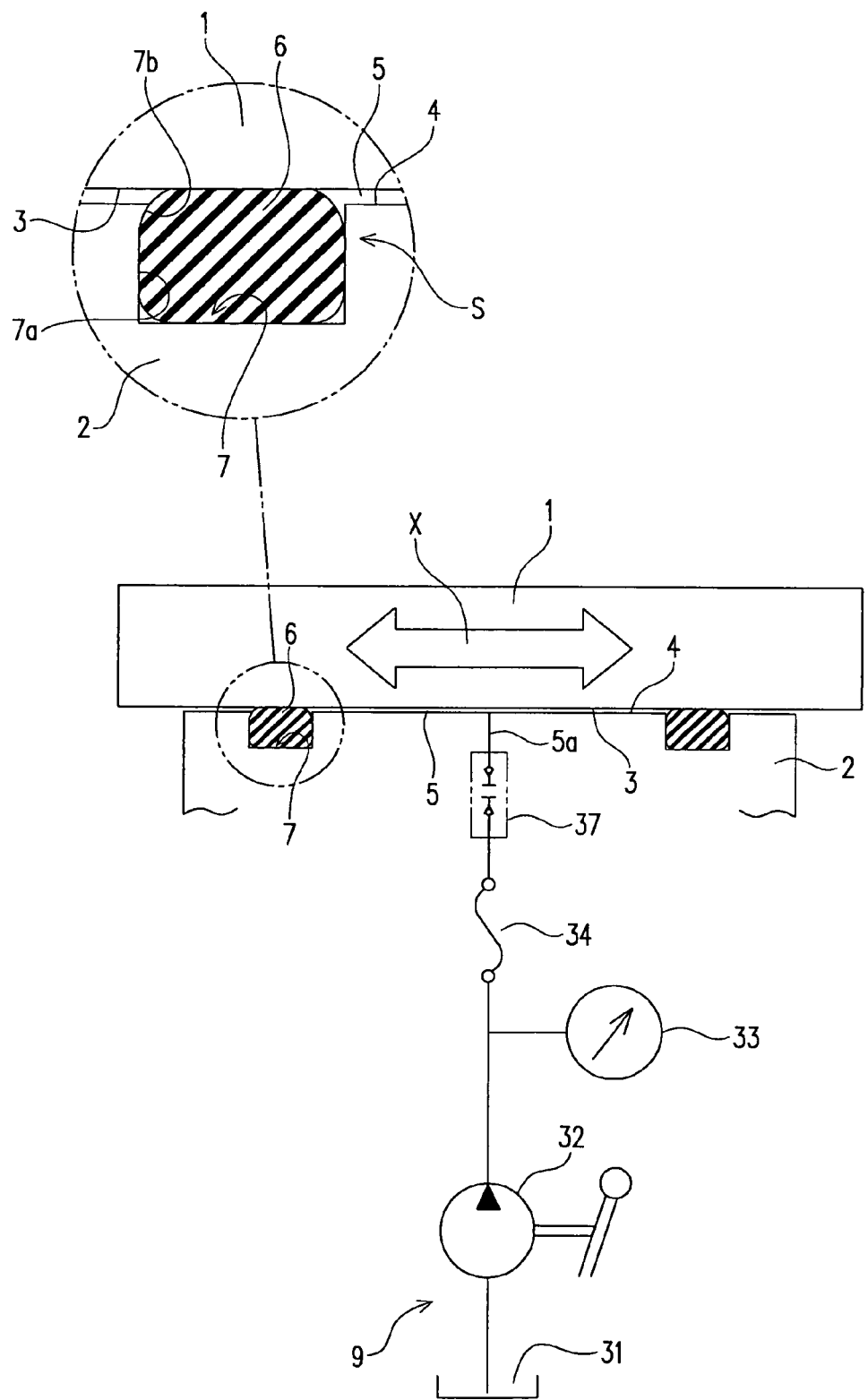
FIG. 5 is an explanatory view for the structure of a heavy load support system of Embodiment 3 of the present invention.

This embodiment is illustrated in FIG. 5. In this embodiment, on an upper side of the outer inside wall surface 7a of the ring groove 7 formed in the slide surface 4 of the support member 2 is provided a coming-out blocking portion 7b that is lockingly engaged with an upper edge of the outer circumference of the elastic ring 6 so as to block the coming-out of the elastic ring 6 at the time when fluid has been supplied into the fluid pressure pocket 5. The coming-out blocking portion 7b is formed into a radially inwardly curved shape so as to be lockingly engageable with the elastic ring 6 around the upper edge of its outer circumference through pressure contact when fluid supplied into the fluid pressure pocket 5 has reached a required pressure.

With the above structure, when fluid has been supplied into the fluid pressure pocket 5, the upper edge of the outer circumference of the elastic ring 6 is lockingly engaged with the coming-out blocking portion 7b so that the elastic ring 6 is prevented from being deformed towards the outer circumference by the pressurized fluid. Thus, the coming-out of the elastic ring 6 from the ring groove 7 is effectively blocked. Whereby, it is possible to securely maintain high sealability and ensure a slide surface pressure of a required ultra high pressure (e.g., about 25 MPa) even in a case where the weight of the object exceeds, for example, 10 tons, so that this structure is applicable to the heavy load support system. The coming-out blocking portion 7b may be easily formed when the ring groove 7 is formed (when in a cutting operation). In this case, the ring groove 7 may be formed in the object 1 as well.

Embodiment 4

Figure 6:
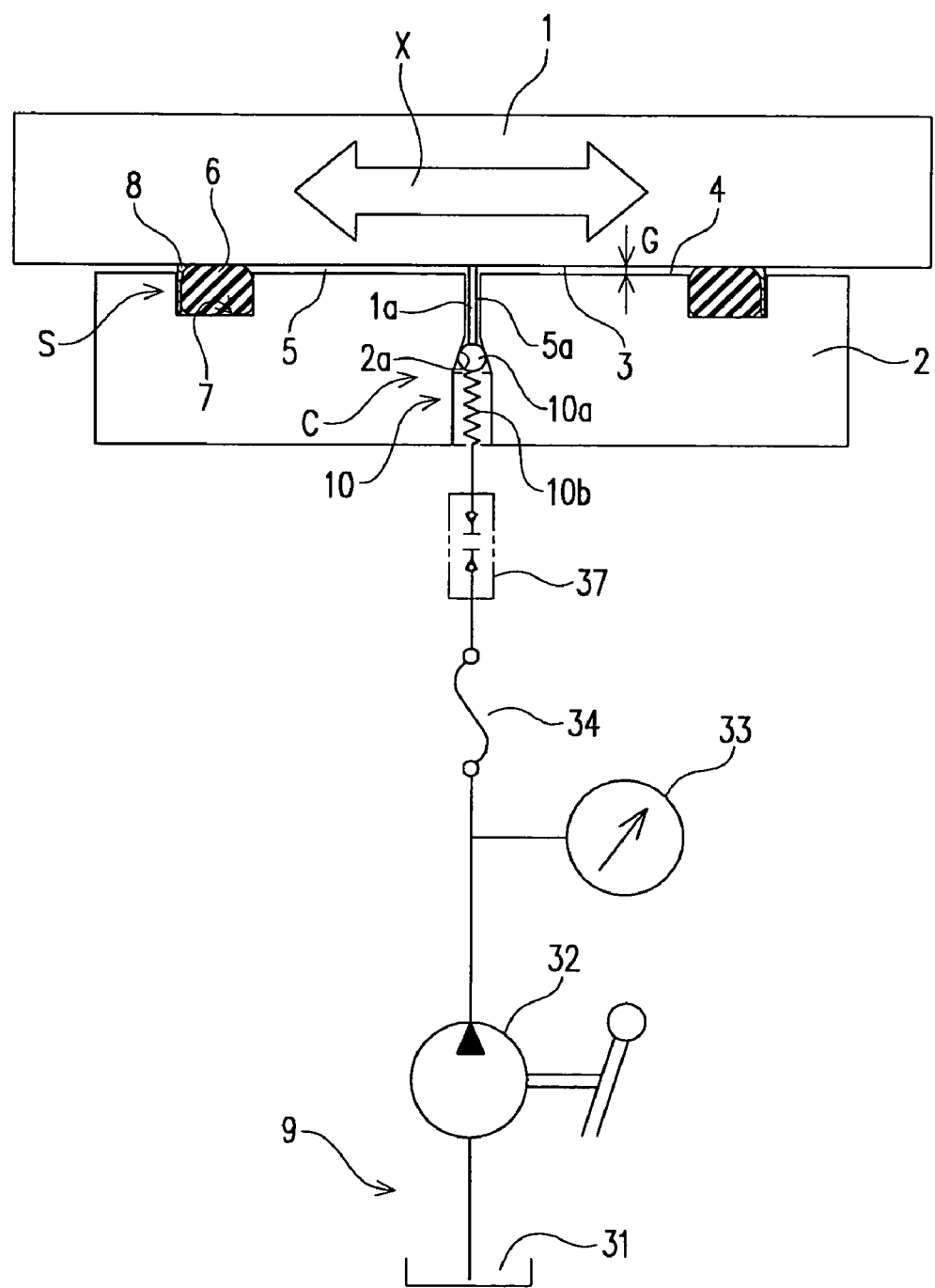
FIG. 6 is an explanatory view for the structure of a heavy load support system of Embodiment 4 of the present invention.

This embodiment is illustrated in FIG. 6. In this embodiment, there is provided a fluid supply stopping means C for stopping supply of fluid into the fluid pressure pocket 5 at the time when fluid has been supplied into the fluid pressure pocket 5 and a give clearance G (0.1 mm to 0.2 mm) has been created between the slide surfaces 3, 4. In the example as illustrated, the fluid supply stopping means C is formed by the use of a check valve 10 disposed in the fluid supply passage 5a leading to the fluid pressure pocket 5.

This fluid supply stopping means C is made up of the check valve 10 that includes a steel ball 10a for being brought into press contact with a tapered conduit 2a being in communication with the fluid pressure pocket 5 and having a tapered shape, in such a manner as to be able to be contacted thereto and separated therefrom and a coil spring 10b for urging the steel ball 10a towards the tapered conduit 2a in a press contact direction, and a push rod 1a for pushing the steel ball 10a in such a direction away from the tapered conduit 2a. The push rod 1a has an upper end disposed facing the slide surface 3 of the object 1, and is placed in the fluid supply passage 5a through the fluid pressure pocket 5 so as to have a lower end disposed facing the steel ball 10a within the tapered conduit 2a.

According to the above structure, in an initial state, the push rod 1a presses the steel ball 10a downwards against the urging force of the coil spring 10b by the weight of the object 1, thereby opening the tapered conduit 2a, so that fluid can be supplied into the fluid pressure pocket 5 upon the operation of the manual pump 32. When the fluid pressure within the fluid pressure pocket 5 is increased and the object 1 is lifted upwards to have a clearance between the slide surfaces 3, 4, the push rod 1a is also lifted upwards. Thus, the steel ball 10a is pushed by the urging force of the coil spring 10b to the tapered conduit 2a, thereby closing the tapered conduit 2a, so that the supply of fluid is stopped, and hence the fluid pressure within the fluid pressure pocket 5 is maintained at a required pressure. That is, the fluid supply stopping means C is structured to provide a given clearance by the associated operation of the steel ball 10a of the check valve 10 by the push rod 1a disposed facing the slide surface 3 of the object 1. Whereby, it is possible to securely control the clearance.

Embodiment 5

Figure 7:
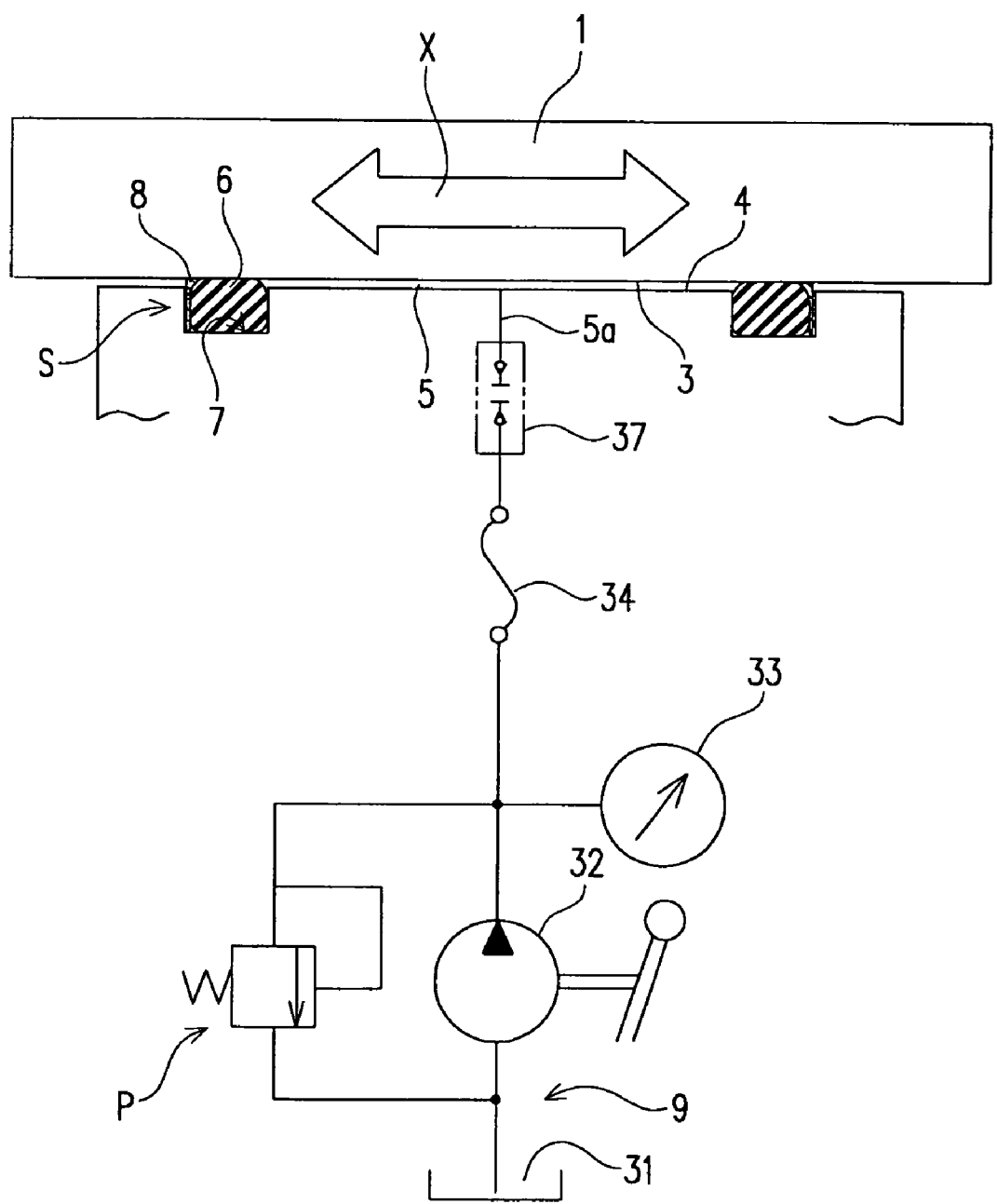
FIG. 7 is an explanatory view for the structure of a heavy load support system of Embodiment 5 of the present invention.
Figure 8:
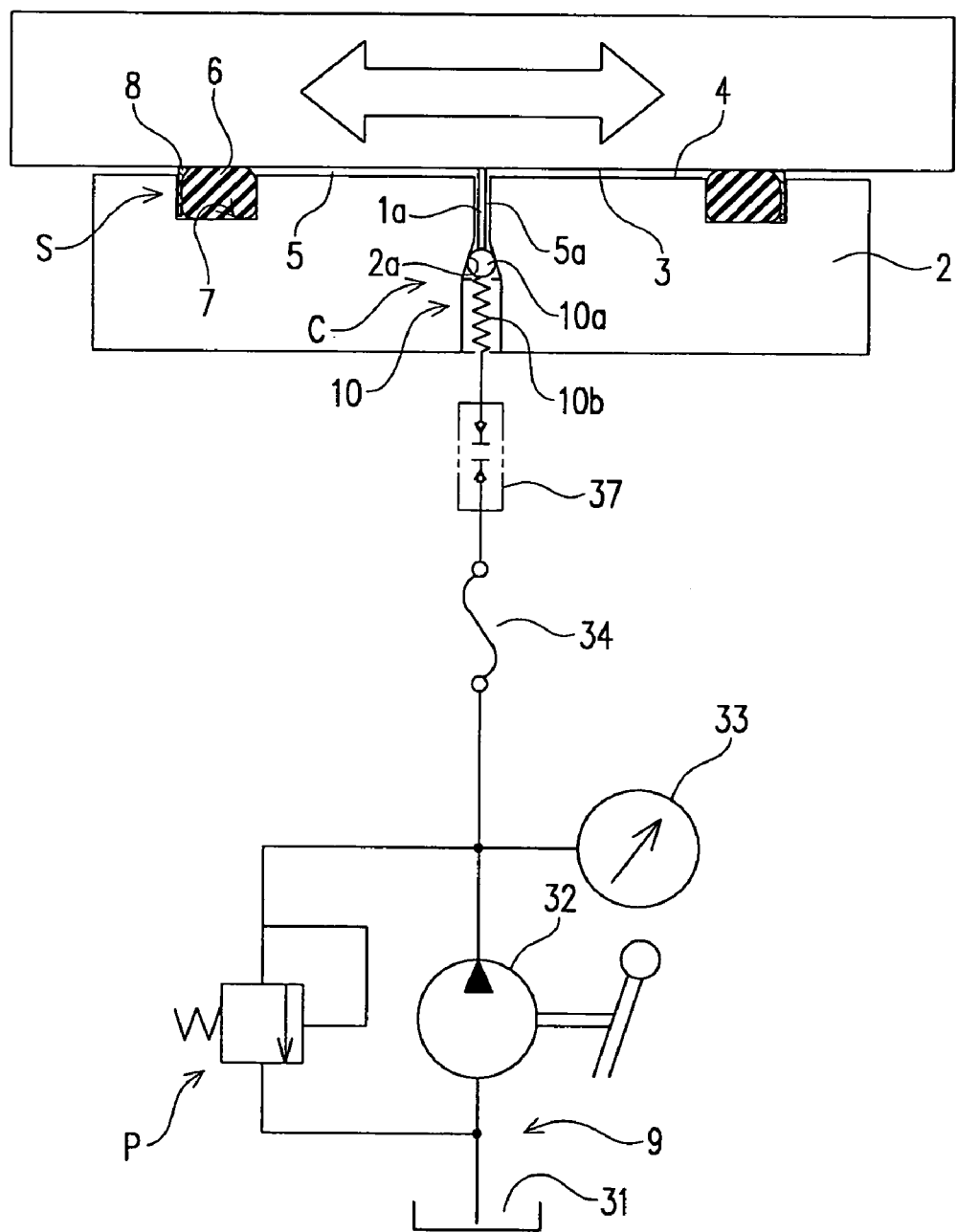
FIG. 8 is an explanatory view for the structure of another heavy load support system of the same.

This embodiment is illustrated in FIGS. 7 and 8. In this embodiment, there is provided a pressure control valve P that stops the supply of fluid into the fluid pressure pocket 5 at the time when fluid supplied into the fluid pressure pocket 5 has reached a required pressure. In any one of the illustrated examples, there is provided a pressure control valve P made up of a relief valve that is disposed in parallel with the manual pump 32 and actuated by a pilot pressure. In the example of FIG. 7, when the pressure of fluid supplied into the fluid pressure pocket 5 by the manual pump 32 reaches a required pressure (pilot pressure), a part of the fluid flows back into the fluid tank 31 so that a required pressure is maintained.

In the example of FIG. 8, at the time when a given clearance G (0.1 mm to 0.2 mm) has been created between the slide surfaces 3, 4 by the check valve 10 (fluid supply stopping means C) that is operated in association with the push rod 1a, the supply of fluid into the fluid pressure pocket 5 is stopped. The reason for providing the pressure control valve P, regardless of this fact, is that when excessive fluid is about to be supplied because a given clearance G has not been created between the slide surfaces 3, 4 even after the fluid pressure within the fluid pressure pocket 5 has reached a required pressure, due to the excessive weight of the object 1 or any troubles, the pressure control valve P is to be actuated to immediately stop the supply of fluid so as to prevent unusual increase of the pressure within the fluid pressure pocket 5. Whereby, it is possible to prevent the occurrence of troubles such as damages to the system.

Although no illustration is made, a control means (not illustrated, e.g., made up of a microcomputer including a CPU for performing various calculations and a RAM, ROM or the like having a storing function) may be provided to control the supply of fluid into the fluid pressure pocket 5 based on the detected pressure value of fluid supplied into the fluid pressure pocket 5. With this structure, the control means is driven by a control program previously input and set, so that the pressure setting for fluid within the fluid pressure pocket 5 can be automatically performed.

Thus, for example, even in a case where the weight or center of gravity of a workpiece is changed (such as in a case where plural workpieces having different weights and centers of gravities are sequentially and successively machined by a working machine), the set pressure of fluid can be easily changed and hence the efficiency in machining operation can further be improved. In a specific example regarding this case, the fluid supply means 9 is of an electric motor-driven type, and structured so that a fluid discharging pump is driven by a motor, a pressure detection signal from the pressure gauge 33 is inputted into the control means via an A/D converter, and a control signal is outputted to the motor (and the pressure control valve P) from the control means.

Embodiment 6

Figure 9:
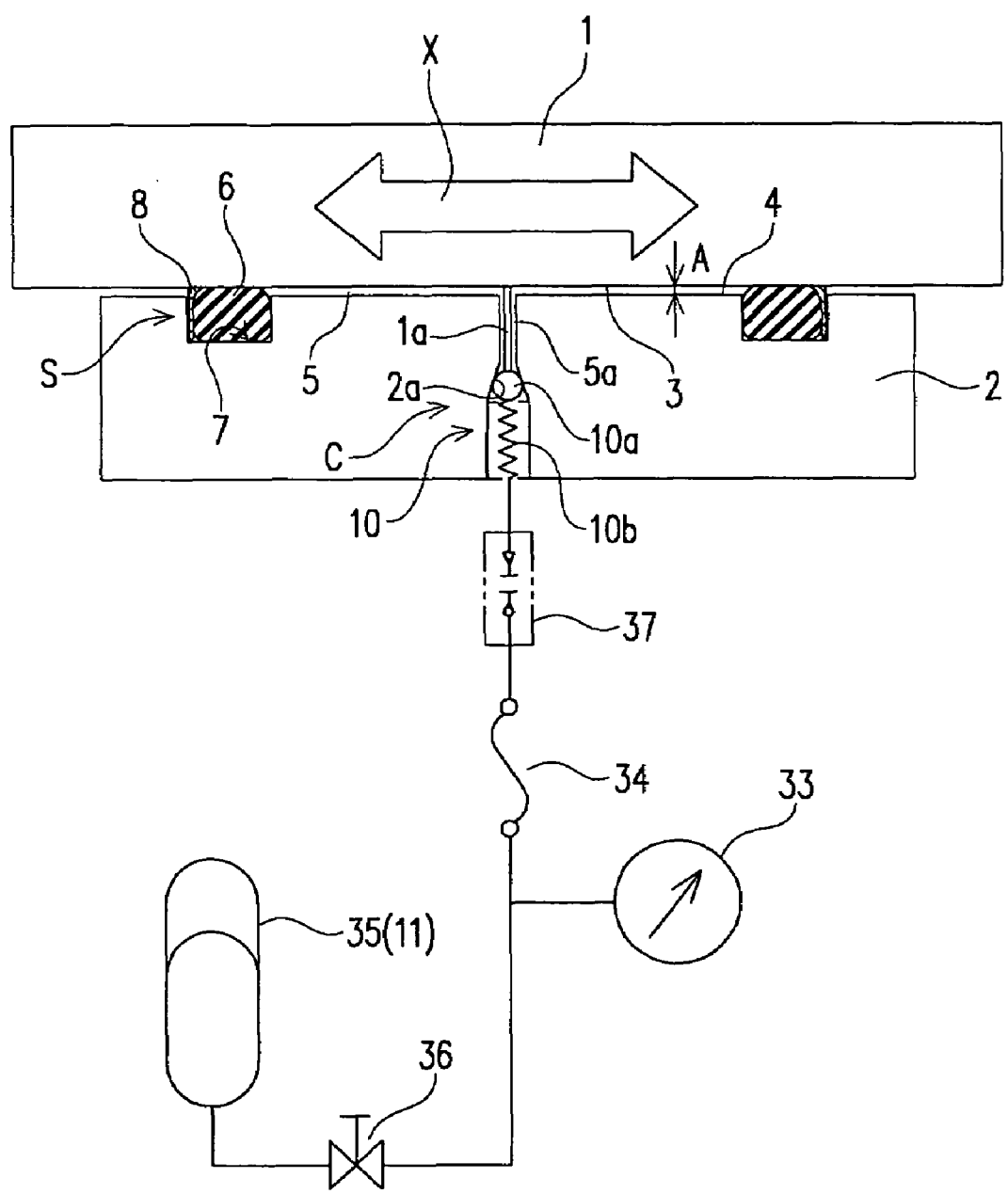
FIG. 9 is an explanatory view for the structure of a heavy load support system of Embodiment 6 of the present invention.

This embodiment is illustrated in FIG. 9. In this embodiment, in place of the fluid tank 31 and the manual pump 32, an accumulator 35 and a manually opening and closing valve 36 are provided as a pressure adjusting means 11 to simplify the structure of the fluid supply system. A fluid pressure energy accumulated by the accumulator 35 maintains the fluid pressure within the fluid pressure pocket 5 at a required pressure. The accumulator 35 may be of any one of an air compression type and a spring type. For the use of the heavy load support system by separating and carrying the same to the side, the hose 34 may be separated from the quick joint 37 in the same manner as in the aforesaid embodiments.

Embodiment 7

Figure 10:
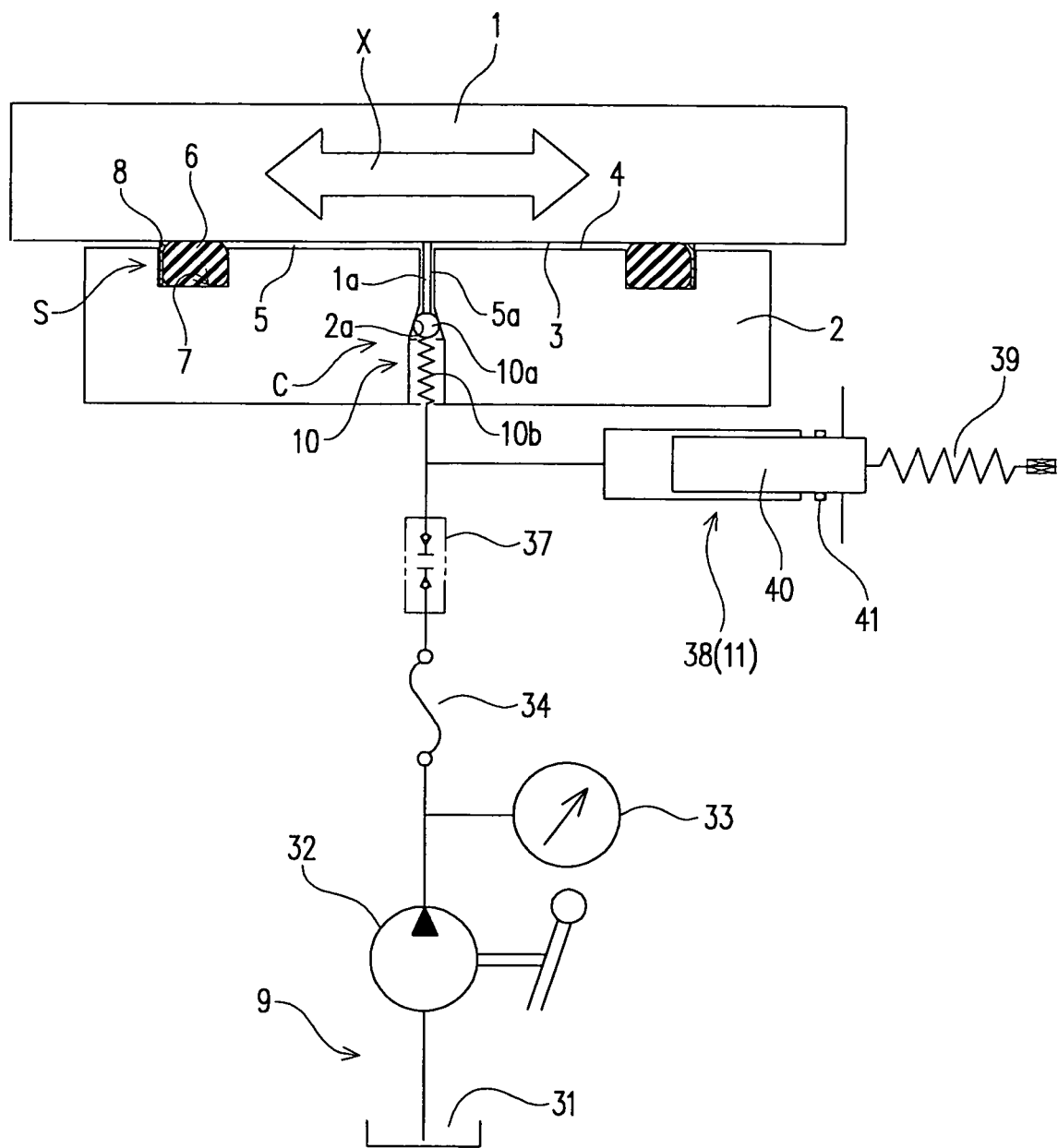
FIG. 10 is an explanatory view for the structure of a heavy load support system of Embodiment 7 of the present invention.

This embodiment is illustrated in FIG. 10. In this embodiment, there is provided a fluid pressurizing cylinder 38 as the pressure adjusting means 11 in the fluid supply passage 5a that is in communication with the fluid pressure pocket 5, and the quick joint 37 on the upstream side of the fluid supply passage 5a in the same manner as in the aforesaid embodiments. Accordingly, upon the separation of the hose 34 from the quick joint 37, the fluid supply passage 5a to the fluid pressure pocket 5, which passage contains the fluid pressing cylinder 38, turns to be a closed passage with a pressure thereof capable of being adjusted. The fluid pressurizing cylinder 38 is structured to be able to pressurize fluid by having a piston 40 pressing thereinto upon operation of an irreversible rotary screw member 39, as illustrated in the Figure. In FIG. 10, a reference numeral 41 represents an O-ring fitted around the piston 40.

With the structure as described above, as illustrated in FIG. 10, in a case where the fluid supply means 9, which has been separated upon separation of the hose 34 from the quick joint 37, is used after the fluid pressurized to a required pressure has been supplied into the fluid pressure pocket 5 with the fluid supply means 9 held in the connected state, the subsequent pressure adjustment of fluid within the fluid pressure pocket 5 may be made by the fluid pressurizing cylinder 38.

Thus, this heavy load support system can be carried to the site upon the separation of the hose 34 while having the arrangement with the fluid pressurizing cylinder 38, and furthermore significantly improve its convenience because it immediately functions as a support system upon the operation of the fluid pressurizing cylinder 38. When in use at the site upon separation, it is needless to say that fluid can be supplemented upon the connection of the fluid supply means 9, according to needs and circumstances. Although no illustration is made, the irreversible rotary screw member 39 is preferably provided with an operation lever for ease of operation. An accumulator may be provided in place of the fluid pressurizing cylinder 38.

Embodiment 8

Figure 11:
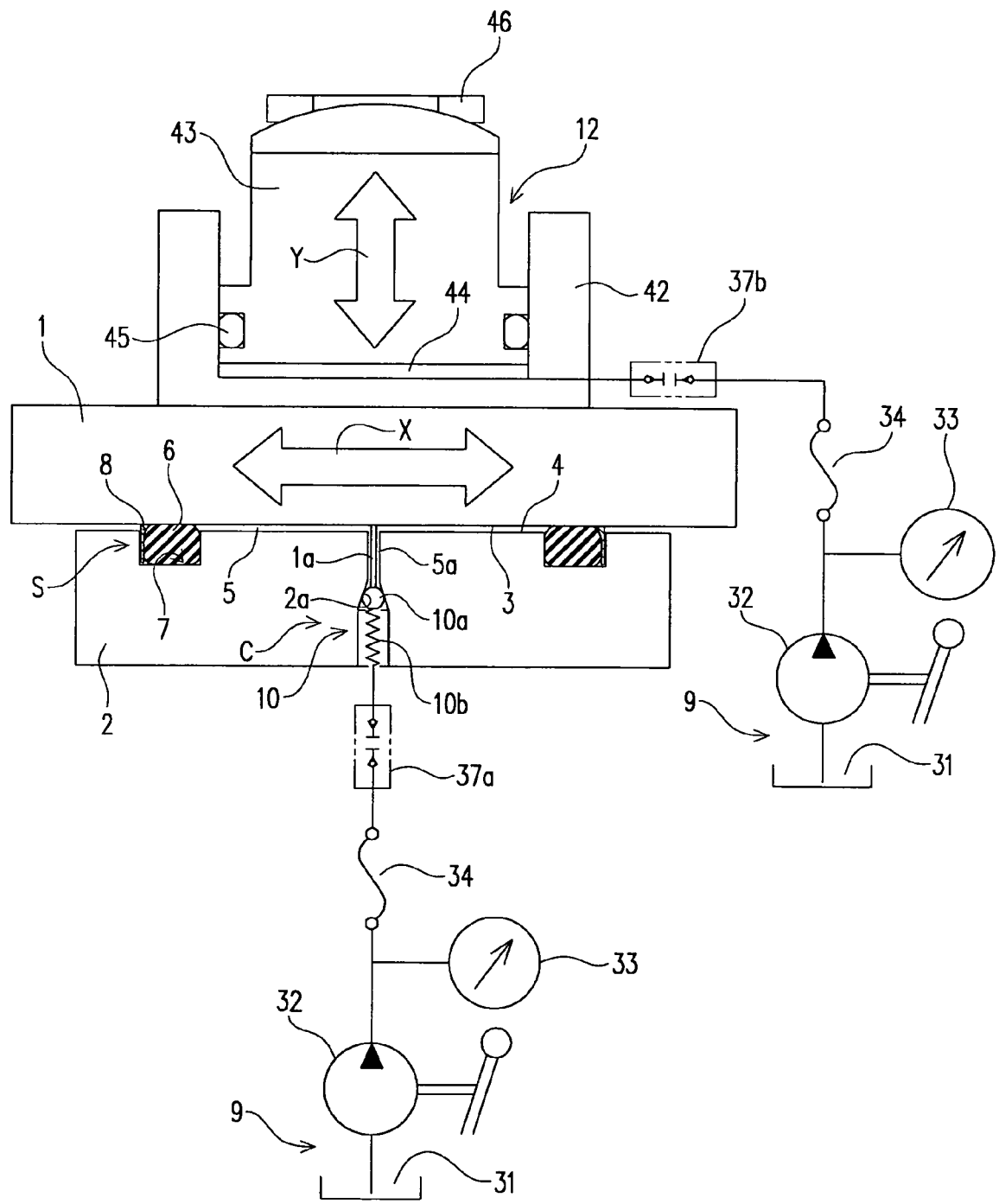
FIG. 11 is an explanatory view for the structure of a heavy load support system of Embodiment 8 of the present invention.

This embodiment is illustrated in FIG. 11. In this embodiment, there is provided a fluid jack 12 that is actuated in a direction (vertical direction) substantially orthogonal to the moving direction (horizontal direction) of the object 1 and is disposed on the object 1 (above the fluid pressure pocket 5). The fluid jack 12 includes a cylinder 42 mounted on the top side of the object 1 and a piston 43 to be placed in the cylinder 42 via an O-ring 45, in which fluid is supplied from the fluid supply means 9 into a fluid pressure pocket 44 defined between the piston 43 and the cylinder 42. The piston 43 is provided on the top side with a spherical seat 46 for supporting a load so that a workpiece (or workpiece mounting table) can be supported via this spherical seat 46. In this case, quick joints 37 (37a, 37b) are respectively provided in a fluid supply passage 5a to the fluid pressure pocket 5 and a fluid supply passage to the fluid pressure pocket 44 of the fluid jack 12.

For example, four (or three) heavy load support systems having the aforesaid structure may be provided to the thus structured heavy load system to support a workpiece at four corners (or three corners) so that the workpiece can be moved in three dimensional directions and hence can be positioned in three dimensions relative to a working machine. An arrow Y represents a moving direction (e.g., vertical direction) of the piston 43. In this case, although no illustration is made, fluid may be supplied into the fluid pressure pocket 5 and the fluid pressure pocket 44 from the single fluid supply means 9 via a switching valve (rotary valve, spool valve, etc.).

Embodiment 9

Figure 12:
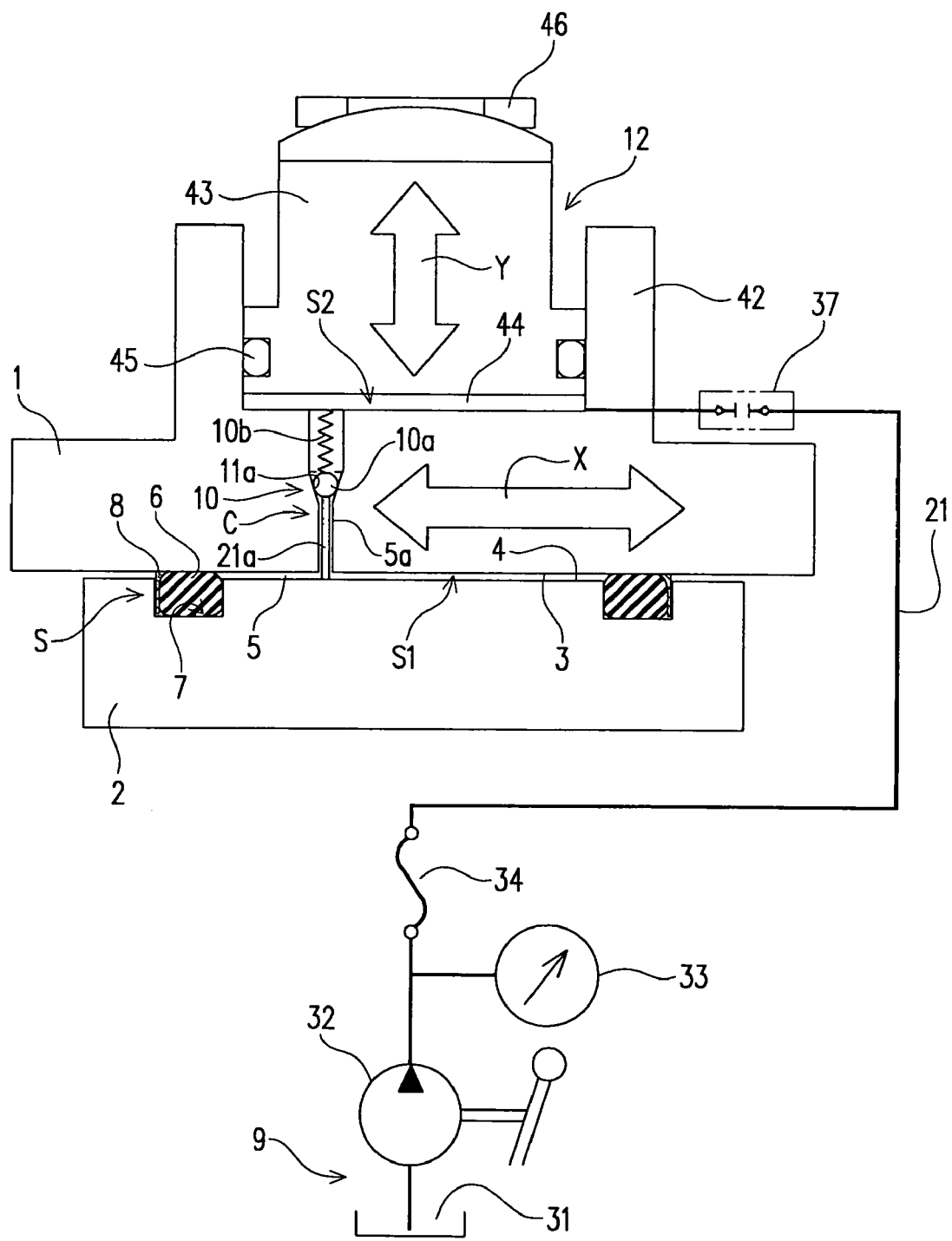
FIG. 12 is an explanatory view for the structure of a heavy load support system of Embodiment 9 of the present invention.

This embodiment is illustrated in FIG. 12. In this embodiment, there is provided the fluid jack 12 that is actuated in a direction (vertical direction) substantially orthogonal to the moving direction (horizontal direction) of the object 1 and is disposed on the object 1 (above the fluid pressure pocket 5). The fluid jack 12 includes the cylinder 42 formed on an upper portion of the object 1 and the piston 43 to be placed in the cylinder 42 via the O-ring 45. Fluid is introduced into the fluid pressure pocket 44, which is formed between the piston 43 and the cylinder 42, from the single fluid supply means 9 via a fluid supply passage 21, and then into the fluid pressure pocket 5 of the support member 2 from the fluid pressure pocket 44 via the fluid supply stopping means C provided in the fluid supply passage 5a of the object 1. In this case, the quick joint 37 is disposed in a fluid supply passage to the fluid pressure pocket 44.

This fluid supply stopping means C is made up of the check valve 10 that includes the steel ball 10a for being brought into press contact with a tapered conduit 11a being in communication with the fluid pressure pocket 5 and having a tapered shape in such a manner as to be able to be contacted thereto and separated therefrom and the coil spring 10b for urging the steel ball 10a towards the tapered conduit 11a in a press contact direction, and a push rod 21a for pressing the steel ball 10a in such a direction away from the tapered conduit 11a. The push rod 21a has a lower portion dispose facing the slide surface 4 of the support member 2, and is placed in the fluid supply passage 5a through the fluid pressure pocket 5 so as to have a leading end disposed facing the steel ball 10a within the tapered conduit 11a.

A planar dimension S1 of the fluid pressure pocket 5 located below is larger than a planar dimension S2 of the fluid pressure pocket 44 located above. Therefore, once fluid is supplied into both the fluid pressure pockets 5, 44 from the fluid supply means 9, the pressure of fluid within the fluid pressure pocket 5 located below reaches a required pressure and a given clearance is created between the slide surfaces 3, 4 so that the check valve 10 is closed and thus fluid is supplied only to the fluid pressure pocket 44 in the subsequent operation. At this moment, the pressure of fluid within the fluid pressure pocket 44 located above may be adjusted to first perform vertical positioning and then the centering operation in the horizontal direction. In a case where four or more heavy load support systems are used to support a large-sized workpiece, the vertical positioning is first performed to securely support the workpiece by the spherical seats 46 of the heavy load support systems, avoiding a statically indeterminate support, and then the centering operation in the horizontal direction is performed so that the centering can be performed under the stabilized conditions.

Embodiment 10

Figure 13:
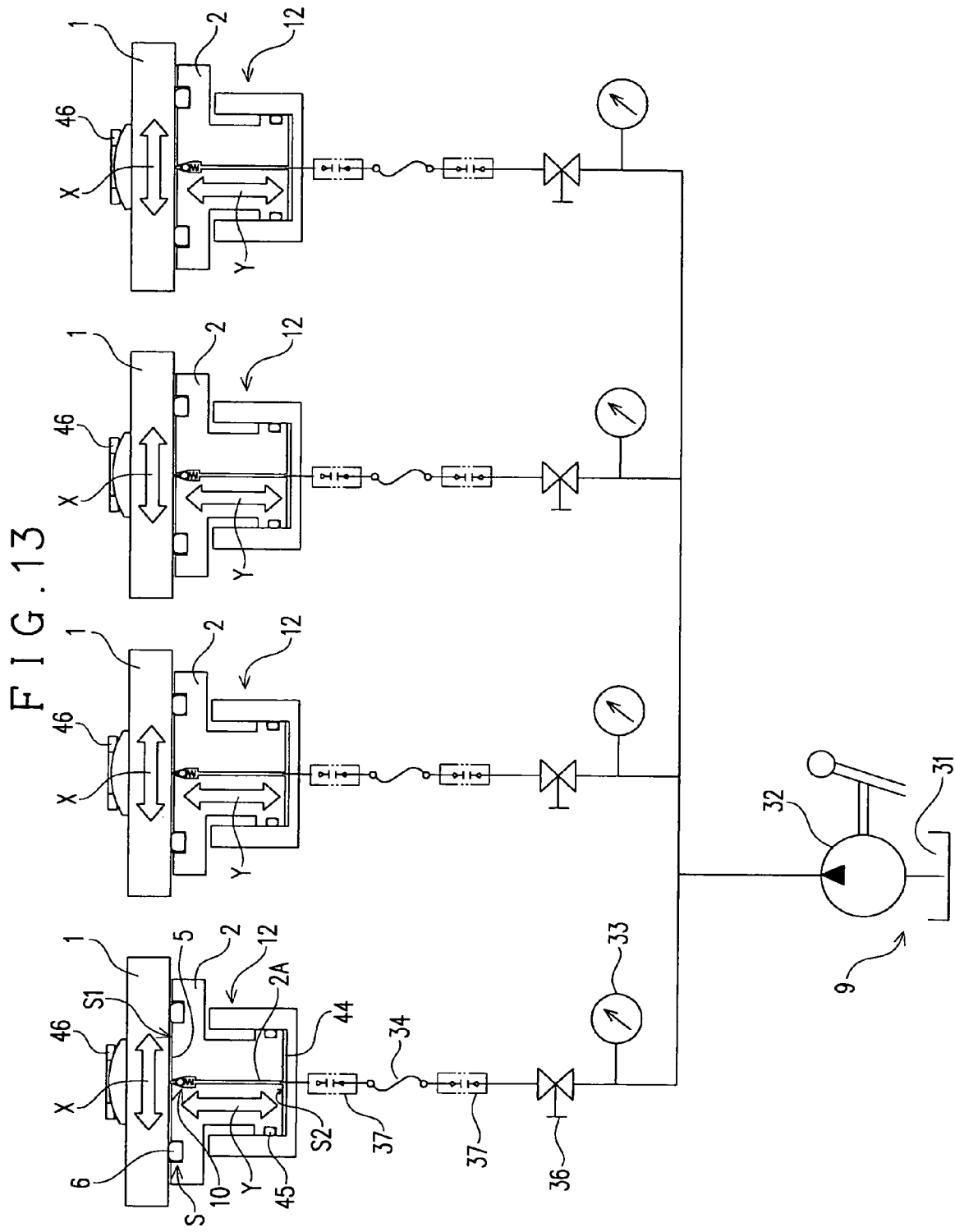
FIG. 13 is an explanatory view for the structure of a heavy load support system of Embodiment 10 of the present invention.

This embodiment is illustrated in FIG. 13. In this embodiment, plural (e.g., four) heavy load support systems are provided and the single fluid supply means 9 supplies fluid to them; fluid jacks 12 that are actuated in a direction substantially orthogonal to the moving direction of the object 1 are respectively disposed on the lower sides of the support members 2 for supporting the objects 1 of the heavy load support systems; and the spherical seats 46 are provided on the upper side of the object 1, so that a single workpiece or workpiece mounting table (not shown) is mounted on the spherical seats 46.

In this case, fluid supplied into the fluid pressure pocket 5 is supplied through the fluid pressure pockets 44 of the fluid jacks 12. Specifically, each of the support members 2 has a communication passage 2A that leads from the fluid pressure pocket 44 to the fluid pressure pocket 5. The planar dimension S1 of the fluid pressure pocket 5 located above is larger than the planar dimension S2 of the fluid pressure pocket 44 located below. Therefore, when fluid is supplied from the fluid supply means 9 to both the fluid pressure pockets 5, 44, the pressure of fluid within the fluid pressure pocket 5 located above reaches a required pressure and a given clearance is created between the slide surfaces 3, 4 so that the supply of fluid from the check valve 10 to the fluid pressure pocket 5 is stopped. At this moment, the pressure of fluid within the fluid pressure pocket 44 located below may be adjusted, thereby achieving a stabilized, statically determinate support, and then the centering operation in the horizontal direction may be performed.

Embodiment 11

Figure 14:
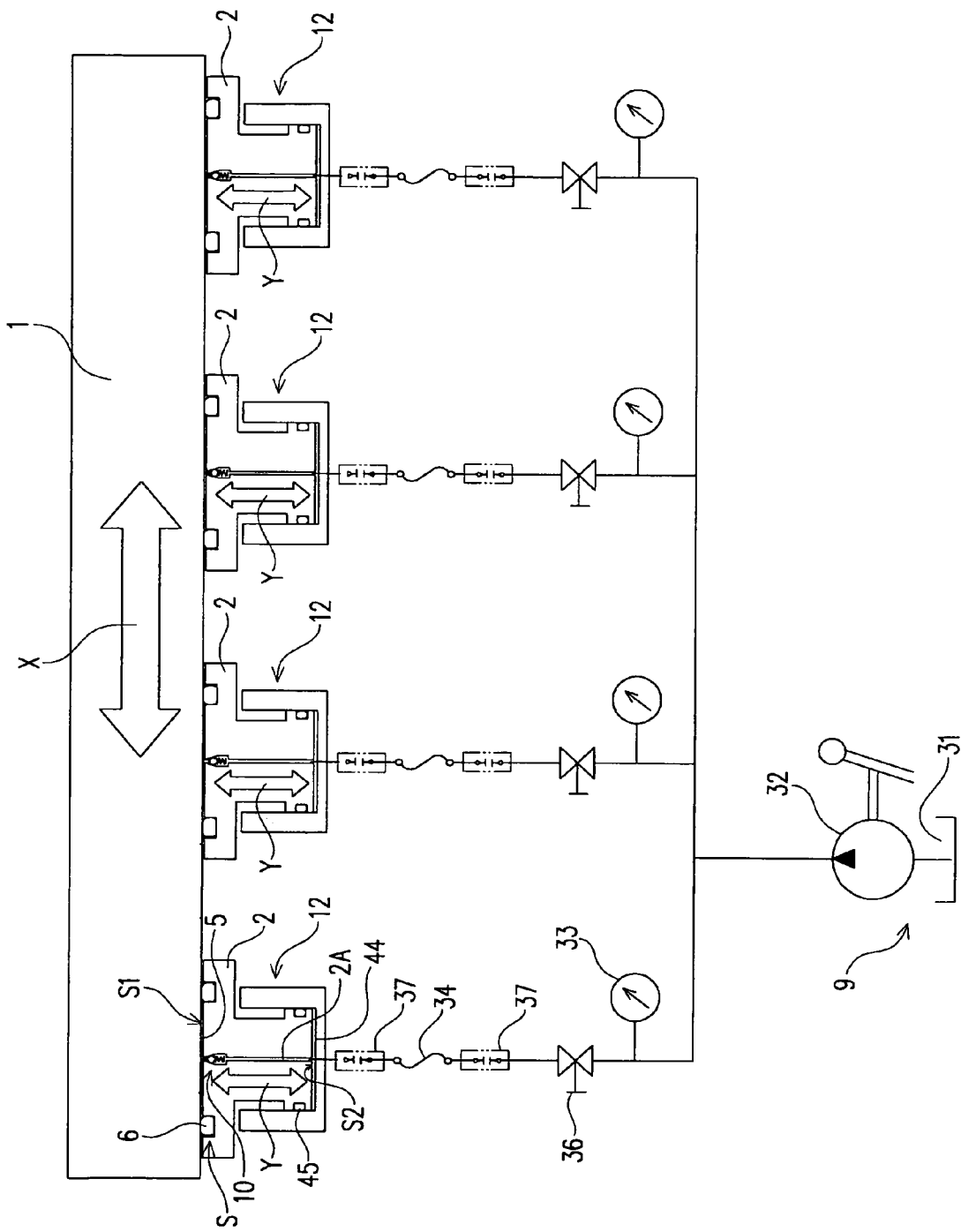
FIG. 14 is an explanatory view for the structure of a heavy load support system of Embodiment 11 of the present invention.

This embodiment is illustrated in FIG. 14. In this embodiment, the single workpiece (object to be supported) 1 having a smooth slide surface formed on the bottom side thereof is supported on the support members 2 of plural (e.g., four) heavy load support systems. With this, a workpiece mounting table is not needed. In this case as well, when fluid is supplied from the fluid supply means 9, the pressure of fluid within the fluid pressure pocket 5 located above reaches a required pressure and a given clearance is created between the slide surfaces 3, 4 so that the supply of fluid from the check valve 10 to the fluid pressure pocket 5 is stopped. At this moment, the pressure of fluid within the fluid pressure pocket 44 located below may be adjusted, thereby achieving a stabilized, statically determinate support, and then the centering operation in the horizontal direction may be performed.

In this case, for example, a slide surface may be formed on the workpiece in the lengthwise direction and plural support members 2, . . . are aligned in parallel, (e.g., in two lines) in the same direction to support the workpiece 1 along its opposite lateral sides, so that the workpiece 1 may be endlessly moved in the lengthwise direction.

The invention claimed is:

1. A heavy load support system, comprising:
an object and a support member for supporting the object;
a hydraulic oil seal mechanism for preventing leakage of hydraulic oil, which is supplied into an hydraulic pocket defined between slide surfaces respectively formed on oppositely facing sides of the object and the support member;
a connection means for connecting to the hydraulic pocket a hydraulic oil supply means for supplying hydraulic oil thereto; and
a hydraulic oil supply stopping means for stopping supply of hydraulic oil into the hydraulic pocket at the time when a given clearance has been created between the slide surfaces, said hydraulic oil supply stopping means including a check valve that includes a steel ball for being brought into press contact with a tapered conduit being in communication with the hydraulic pocket and having a tapered shape, in such a manner as to be able to be contacted thereto and separated therefrom a coil spring for urging the steel ball towards the tapered conduit in a press contact direction, and a push rod for pushing the steel ball in such a direction away from the tapered conduit, wherein the push rod is placed in a hydraulic oil supply passage through the hydraulic pocket, and has an upper end disposed facing the slide surface of the object and a lower end disposed facing the steel ball within the tapered conduit.

2. The heavy load support system according to claim 1, wherein a pressure control valve for stopping supply of hydraulic oil into the hydraulic pocket at the time when hydraulic oil being supplied into the hydraulic pocket has reached a required pressure is provided.

3. The heavy load support system according to claim 1, wherein a pressure adjusting means for adjusting the pressure of the hydraulic pocket to a required pressure is disposed in the hydraulic oil supply passage to the hydraulic pocket, and the hydraulic oil supply passage to the hydraulic pocket, which passage contains the pressure adjusting means, constitute a closed fluid passage.

4. A heavy load support system, comprising:
an object and a support member for supporting the object;
a hydraulic oil seal mechanism for preventing leakage of hydraulic oil, which is supplied into an hydraulic pocket defined between slide surfaces respectively formed on oppositely facing sides of the object and the support member;
a connection means for connecting to the hydraulic pocket a hydraulic oil supply means for supplying hydraulic oil thereto;
a hydraulic oil supply stopping means for stopping supply of hydraulic oil into the hydraulic pocket at the time when a given clearance has been created between the slide surfaces; and
a hydraulic jack that is actuated in a vertical direction and which is disposed above or below the hydraulic pocket.

5. A heavy load support system, comprising:
an object and a support member for supporting the object;
a hydraulic oil seal mechanism for preventing leakage of hydraulic oil, which is supplied into an hydraulic pocket defined between slide surfaces respectively formed on oppositely facing sides of the object and the support member;
a connection means for connecting to the hydraulic pocket a hydraulic oil supply means for supplying hydraulic oil thereto;
a hydraulic oil supply stopping means for stopping supply of hydraulic oil into the hydraulic pocket at the time when a given clearance has been created between the slide surfaces;
wherein the slide surface of the support member has a ring groove for fittingly receiving an elastic ring for preventing leakage of hydraulic oil, and the elastic ring is fitted, along with a blocking ring, in the ring groove, in which the blocking ring is disposed outside the elastic ring and fitted on the elastic ring for blocking the elastic ring from coming out from the ring groove, and when hydraulic oil supplied into the hydraulic pocket has reached a required pressure, the blocking ring is, along with the elastic ring, brought into press contact with the slide surface of the object so as to block the coming-out of the elastic ring; and
wherein the blocking ring has an inner circumference whose upper edge is provided with a coming-out blocking portion that is formed into a radially inwardly curved shape so as to be lockingly engaged with the elastic ring around an outer circumferential edge thereof through pressure contact for prevention of a radially outward deformation of the outer circumferential edge of a portion of the elastic ring, which portion contacting the object.

6. A heavy load support system, comprising:
an object and a support member for supporting the object;
a hydraulic oil seal mechanism for preventing leakage of hydraulic oil, which is supplied into an hydraulic pocket defined between slide surfaces respectively formed on oppositely facing sides of the object and the support member;
a connection means for connecting to the hydraulic pocket a hydraulic oil supply means for supplying hydraulic oil thereto;

a hydraulic oil supply stopping means for stopping supply of hydraulic oil into the hydraulic pocket at the time when a given clearance has been created between the slide surfaces;

wherein the support member has a ring groove for fittingly receiving an elastic ring for preventing leakage of hydraulic oil, and the elastic ring has an outer circumference whose upper edge is provided with a hardened portion integrally formed therewith for blocking the elastic ring from coming out from the ring groove, and when hydraulic oil supplied into the hydraulic pocket has reached a required pressure, an upper surface of the hardened portion is brought into press contact with the slide surface of the object in surface-to-surface contact, and a side surface of the hardened portion is brought into press contact with an outer inside wall surface of the ring groove in surface-to-surface contact, thereby blocking the coming-out of the elastic ring.

7. A heavy load support system, comprising:

an object and a support member for supporting the object;

a hydraulic oil seal mechanism for preventing leakage of hydraulic oil, which is supplied into an hydraulic pocket defined between slide surfaces respectively formed on oppositely facing sides of the object and the support member;

a connection means for connecting to the hydraulic pocket a hydraulic oil supply means for supplying hydraulic oil thereto;

a hydraulic oil supply stopping means for stopping supply of hydraulic oil into the hydraulic pocket at the time when a given clearance has been created between the slide surfaces; and wherein the slide surface of the support member has a ring groove for fittingly receiving an elastic ring for preventing leakage of hydraulic oil, and the ring groove has an outer inside wall surface whose upper portion is provided with a coming-out blocking portion that is lockingly engaged with an upper edge of an outer circumference of the elastic ring so as to block the elastic ring from coming out from the ring groove at the time when hydraulic oil supplied into the hydraulic pocket has reached a required pressure.

* * * * *